(12) United States Patent
Redinger et al.

(10) Patent No.: US 11,609,202 B2
(45) Date of Patent: Mar. 21, 2023

(54) ELECTRODE PLACEMENT FOR VERIFYING STRUCTURAL INTEGRITY OF MATERIALS

(71) Applicant: 3M INNOVATIVE PROPERTIES COMPANY, St. Paul, MN (US)

(72) Inventors: David H. Redinger, Afton, MN (US); Christopher R. Yungers, Saint Paul, MN (US); Eric M. Chinnock, Chanhassen, MN (US); Jennifer F. Schumacher, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 44 days.

(21) Appl. No.: 17/301,082

(22) Filed: Mar. 24, 2021

(65) Prior Publication Data

US 2021/0208094 A1 Jul. 8, 2021

Related U.S. Application Data

(63) Continuation of application No. 16/461,452, filed as application No. PCT/US2017/061745 on Nov. 15, 2017, now Pat. No. 10,983,081.

(Continued)

(51) Int. Cl.
*G01N 27/20* (2006.01)
*G01N 27/04* (2006.01)

(52) U.S. Cl.
CPC ........... *G01N 27/20* (2013.01); *G01N 27/041* (2013.01); *G01N 27/045* (2013.01)

(58) Field of Classification Search
CPC ..... G01N 27/20; G01N 27/041; G01N 27/045
See application file for complete search history.

(56) References Cited

U.S. PATENT DOCUMENTS

| 4,764,970 A | 8/1988 | Hayashi et al. |
| 4,785,243 A | 11/1988 | Abramczyk et al. |

(Continued)

FOREIGN PATENT DOCUMENTS

| CN | 101832970 A | 9/2010 |
| CN | 205003121 U | 1/2016 |

(Continued)

OTHER PUBLICATIONS

Anatychuk, L.I., "Procedure and Equipment for Measuring Parameters of Thermoelectric Generator Modules", Journal of Electronic Materials, vol. 40, No. 5, 2011, pp. 1292-1297.

(Continued)

*Primary Examiner* — Dominic E Hawkins
(74) *Attorney, Agent, or Firm* — Sriram Srinivasan

(57) ABSTRACT

A technique may include applying a first electrical signal to a first pair of drive electrodes, and, while applying the first electrical signal to the first pair of drive electrodes, determining a first measured voltage using a first measurement electrode. The technique further may include applying a second electrical signal to a second pair of drive electrodes, and, while applying the second electrical signal to the second pair of drive electrodes, determining a second measured voltage using a second, different measurement electrode. The first pair of drive electrodes, the second pair of drive electrodes, the first measurement electrode, and the second, different measurement electrode may from a set of N electrodes electrically coupled to the material. The technique also may include determining whether the material includes a crack or other defect based on a comparison between the first measured voltage and the second measured voltage.

19 Claims, 6 Drawing Sheets

Related U.S. Application Data

(60) Provisional application No. 62/422,959, filed on Nov. 16, 2016.

(56) References Cited

U.S. PATENT DOCUMENTS

| | | | |
|---|---|---|---|
| 4,914,378 | A | 4/1990 | Hayashi et al. |
| 5,258,708 | A | 11/1993 | Sadeghi et al. |
| 6,150,809 | A | 11/2000 | Tiernan et al. |
| 6,210,972 | B1 | 4/2001 | Williams et al. |
| 6,218,846 | B1 | 4/2001 | Ludwig et al. |
| 6,288,528 | B1 | 9/2001 | Goodstine et al. |
| 6,476,624 | B1 | 11/2002 | Chuman et al. |
| 6,922,641 | B2 | 7/2005 | Batzinger et al. |
| 7,088,115 | B1 | 8/2006 | Glenn |
| 7,161,356 | B1 | 1/2007 | Chien |
| 7,443,177 | B1 | 10/2008 | Bowler |
| 7,596,470 | B2 | 9/2009 | Kim |
| 7,705,589 | B2 | 4/2010 | Kim et al. |
| 8,327,306 | B2 | 12/2012 | Oh et al. |
| 8,552,752 | B2 | 10/2013 | Qiu |
| 8,624,401 | B2 | 1/2014 | Ishikawa |
| 8,816,705 | B2 * | 8/2014 | Espejord ............... G01N 27/20 |
| | | | 702/57 |
| 9,037,430 | B1 | 5/2015 | Wiggins et al. |
| 2002/0024346 | A1 | 2/2002 | Ikuta et al. |
| 2003/0184321 | A1 | 10/2003 | Hands |
| 2004/0021461 | A1 | 2/2004 | Goldfine et al. |
| 2004/0241890 | A1 | 12/2004 | Steele et al. |
| 2005/0251062 | A1 | 11/2005 | Choi et al. |
| 2006/0283262 | A1 | 12/2006 | Smits et al. |
| 2008/0001608 | A1 | 1/2008 | Saulnier et al. |
| 2008/0191706 | A1 | 8/2008 | Burnett et al. |
| 2009/0121727 | A1 | 5/2009 | Lynch et al. |
| 2009/0192730 | A1 * | 7/2009 | Tada ............... G01N 27/20 |
| | | | 702/38 |
| 2009/0202387 | A1 | 8/2009 | Dlugos, Jr. et al. |
| 2011/0060536 | A1 * | 3/2011 | Feng ............... G01N 27/041 |
| | | | 324/693 |
| 2012/0013483 | A1 | 1/2012 | Jung et al. |
| 2012/0024346 | A1 | 2/2012 | Bystrom et al. |
| 2012/0153740 | A1 | 6/2012 | Soar |
| 2012/0177177 | A1 | 7/2012 | Masters |
| 2012/0235693 | A1 * | 9/2012 | Feng ............... G01N 27/20 |
| | | | 324/693 |
| 2013/0307566 | A1 | 11/2013 | Malone et al. |
| 2014/0062521 | A1 | 3/2014 | Yamada |
| 2014/0152336 | A1 | 6/2014 | Sasaki et al. |
| 2014/0354307 | A1 | 12/2014 | Clarke et al. |
| 2015/0095000 | A1 | 4/2015 | Patil et al. |
| 2015/0204701 | A1 | 7/2015 | Klicpea |
| 2015/0308980 | A1 | 10/2015 | Bittar et al. |
| 2016/0163607 | A1 | 6/2016 | Oh et al. |
| 2017/0167927 | A1 | 6/2017 | Carkner |

FOREIGN PATENT DOCUMENTS

| | | |
|---|---|---|
| CN | 105 784 790 A | 7/2016 |
| JP | S56-012544 A | 2/1981 |
| JP | S62-047544 A | 3/1987 |
| JP | H03-056848 A | 12/1991 |
| JP | H05-288706 A | 2/1993 |
| JP | 2007 263577 A | 10/2007 |
| WO | WO 89/012833 A1 | 12/1989 |
| WO | WO 2007/075243 A1 | 7/2007 |

OTHER PUBLICATIONS

Aselage, T.L., et. al., "Large Enhancement of Boron Carbides' Seebeck Coefficients through Vibrational Softening" Physical Review Letters, vol. 81, No. 11, 1998, pp. 2316-2319.

Hartov, Alex, et al. "Using voltage sources as current drivers for electrical impedance tomography", Measurement Science and Technology, vol. 13, 2002, pp. 1425-1430.

International Search Report for PCT International Application No. PCT/US2017/061745, dated Feb. 14, 2018, 2 pages.

Lazarovitch, R., et al., "Experimental crack identification using electrical impedance tomography", NDT&E International, vol. 35, No. 5, pp. 301-316, Jul. 1, 2002.

Paraskevopoulous, I., "Solar Soldier: Virtual Reality Simulations and Guidelines for the Integration of Photovoltaic Technology on the Modern Infantry Soldier", School of Engineering and Design, Brunel University, U.K. 141-154.

Ruan, Tao, "Development of an Automated Impedance Tomography System and Its Implementation in Cementitious Materials", Clemson University—TigerPrints, All Dissertations Paper 1756, 2016, pp. 25-49.

Sauliner, Gary J., et al. "A high-precision voltage source for ETI", Physiological Measurement, Institute of Physics Publishing, Bristol, GB, vol. 27, No. 5, May 1, 2006, pp. S221-S236 (XP020105771).

Steinitz, Avital A. "Optimal Camera Placement." 2012 Thesis. (http://www.eecs.berkeley.edu/Pubs/TechRpts/2012/EECS-2012-69.pdf).

Valiant, Leslie G. "The Complexity of Enumeration and Reliability Problems," *SIAM Journal on Computing*, vol. 8, Issue 3, 1979, pp. 410-421.

Zaoui, Abdelhalim "Inverse Problem in Nondestructive Testing Using Arrayed Eddy Current Sensors", Sensors, 2010, vol. 10, p. 8696-8704.

* cited by examiner

ELECTRODE PLACEMENT FOR VERIFYING STRUCTURAL INTEGRITY OF MATERIALS

CROSS REFERENCE TO RELATED APPLICATIONS

This application is a Continuation of U.S. application Ser. No. 16/461,452, filed 16 May 2019, now allowed, which is a US 371 Application based on PCT/US2017/061745, filed on 15 Nov. 2017, which claims the benefit of U.S. Provisional Application No. 62/422,959, filed on 16 Nov. 2016, the disclosures of which are incorporated by reference in their respective entireties herein.

TECHNICAL FIELD

The disclosure relates to techniques for verifying structural integrity of conductive or semiconductive materials.

BACKGROUND

Many materials are useful when their mechanical properties remain intact, but less useful when damaged, such as when cracked. Thus, detection whether these materials are damaged is important. As one example, ceramic body plating is used to protect soldiers, police officers, and other security personnel from projectiles. Ceramic body plating may be useful when undamaged, but may be replaced after being damaged, e.g., after cracking.

X-ray scanning, including X-ray radiography and X-ray computed tomography (CT scanning) may be used to detect cracks or other defects in materials. However, such techniques may utilize large and heavy scanners, which may not be easily portable. Further, X-ray scanning and X-ray CT scanning may be relatively expensive, relatively slow, or both.

SUMMARY

In some examples, the disclosure describes a method for detecting a crack or defect in a material. The method may include applying a first electrical signal to a first pair of drive electrodes. The method also may include, while applying the first electrical signal to the first pair of drive electrodes, determining a first measured voltage using a first measurement electrode. The method further may include applying a second electrical signal to a second pair of drive electrodes. The method additionally may include, while applying the second electrical signal to the second pair of drive electrodes, determining a second measured voltage using a second, different measurement electrode. The first pair of drive electrodes, the second pair of drive electrodes, the first measurement electrode, and the second, different measurement electrode may from a set of N electrodes electrically coupled to the material. The method also may include determining whether the material includes a crack or other defect based on a comparison between the first measured voltage and the second measured voltage.

In some examples, the disclosure describes a method for detecting a crack or defect in a material. The method may include, for each respective pair of drive electrodes of at least one pair of drive electrodes electrically coupled to the material, applying an electrical signal to the respective pair of drive electrodes. The method also may include, for each respective pair of drive electrodes, determining a respective measured voltage using a respective measurement electrode of a plurality of measurement electrodes while applying the electrical signal to the respective pair of drive electrodes. Each respective measurement electrode may be substantially symmetrical to another measurement electrode with reference to a symmetry of the material. The plurality of measurement electrodes are electrically coupled to the material. The method further may include determining whether the material includes a crack or other defect based on comparisons between the respective measured voltages associated with respective measurement electrodes that are substantially symmetrical with reference to the symmetry of the material.

In some examples, the disclosure describes a method for detecting a crack or defect in a material. The method may include, for each respective pair of drive electrodes of a plurality of pairs of drive electrodes electrically coupled to the material, applying a respective electrical signal to the respective pair of drive electrodes. The method also may include, for each respective pair of drive electrodes, determining a respective measured voltage using a respective measurement electrode of a plurality of measurement electrodes while applying the electrical signal to the respective pair of drive electrodes. The geometric configuration of each respective combination of a respective pair of drive electrodes and a respective measurement electrode is selected so that, in the absence of a crack, each respective measured voltage is substantially the same as at least one other respective measured voltage.

In some examples, the disclosure describes a system including a set of N electrodes electrically coupled to a material; an electrical signal source; and a computing device. The computing device may be configured to cause the electrical signal source to apply a first electrical signal to a first pair of drive electrodes. The computing device also may be configured to, while the electrical signal source is applying the first electrical signal to the first pair of drive electrodes, determine a first measured voltage using a first measurement electrode. The computing device further may be configured to cause the electrical signal source to apply a second electrical signal to a second pair of drive electrodes, and, while the electrical signal source is applying the second electrical signal to the second pair of drive electrodes, determine a second measured voltage using a second, different measurement electrode. The first pair of drive electrodes, the second pair of drive electrodes, the first measurement electrode, and the second, different measurement electrode may be from the set of N electrodes. The computing device additionally may be configured to determine whether the material includes a crack or other defect based on a comparison between the first measured voltage and the second measured voltage.

In some examples, the disclosure describes a system including a set of N electrodes electrically coupled to a material; an electrical signal source; and a computing device. The computing device may be configured to, for each respective pair of drive electrodes of at least one pair of drive electrodes, cause the electrical signal source to apply an electrical signal to the respective pair of drive electrodes. The computing device also may be configured to, for each respective pair of drive electrodes, determine a respective measured voltage using a respective measurement electrode of a plurality of measurement electrodes while the electrical signal source is applying the electrical signal to the respective pair of drive electrodes. Each respective measurement electrode is substantially symmetrical to another measurement electrode with reference to the symmetry of the material. The at least one pair of drive electrodes and the plurality of measurement electrodes are from the set of N electrodes. The computing device further may be configured to determine whether the material includes a crack or other defect based on comparisons between the respective measured voltages associated with respective measurement electrodes that are substantially symmetrical with reference to the symmetry of the material.

In some examples, the disclosure describes a system including a set of N electrodes electrically coupled to a material; an electrical signal source; and a computing device. The computing device may be configured to, for each respective pair of drive electrodes of a plurality of pairs of drive electrodes electrically coupled to the material, cause the electrical signal source to apply a respective electrical signal to the respective pair of drive electrodes. The plurality of pairs of drive electrodes are from the set of N electrodes. The computing device also may be configured to, for each respective pair of drive electrodes, determine a respective measured voltage using a respective measurement electrode of a plurality of measurement electrodes while the electrical signal source is applying the electrical signal to the respective pair of drive electrodes. A geometric configuration of each respective combination of a pair of drive electrodes and a respective measurement electrode is selected so that, in the absence of a crack, each respective measured voltage is substantially the same as at least one other respective measured voltage. The computing device additionally may be configured to determine whether the material includes a crack or other defect based on comparisons between the respective measured voltages.

The techniques described herein may provide one or more advantages. For example, using comparisons between multiple voltage measurements from a material may allow determination of whether a material includes a crack or other defect without previous measurement of control voltages, which may simplify determination of whether the material includes the crack or other defect. As another example, a measurement system as described herein may offer improved portability and cost compared to an X-ray radiography or X-ray computed tomography system, while offering sufficient accuracy and detail to enable detection of cracks or other defects in a material being used in the field.

The details of one or more examples are set forth in the accompanying drawings and the description below. Other features, objects, and advantages will be apparent from the description and drawings, and from the claims.

DETAILED DESCRIPTION

Figure 1:
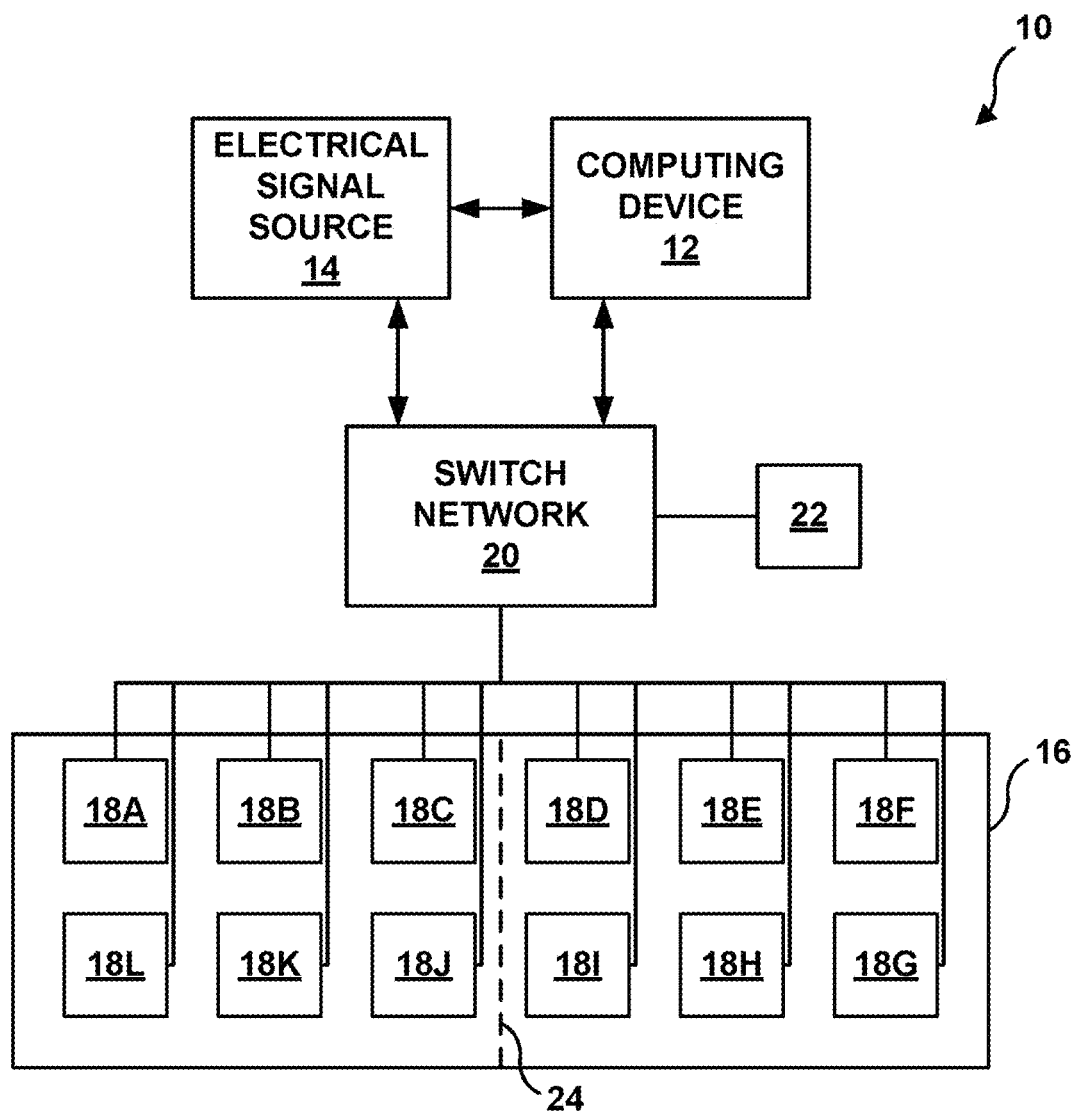
FIG. 1 is a conceptual and schematic diagram block illustrating an example system for determining whether a material includes a crack or other defect based on a comparison between at least a first measured voltage associated with the material and a second measured voltage associated with the material.

The disclosure describes systems and techniques for verifying structural integrity of a material. The techniques may include determining whether the material includes a crack or other defect based on a comparison between at least a first measured voltage associated with the material and a second measured voltage associated with the material. The first measured voltage may be determined by applying an electrical signal to a first pair of drive electrodes electrically coupled to the material and measuring a voltage using a first measurement electrode electrically coupled to the material. The second voltage may be determined by applying an electrical signal to a second pair of drive electrodes electrically coupled to the material and measuring a voltage using a second measurement electrode electrically coupled to the material. The first measurement electrode used to measure the first measured voltage may be different than the second measurement electrode used to measure the second measured voltage. The first pair of drive electrodes and the second pair of drive electrodes may be the same or may be different.

The positions of the pair of drive electrodes and the first and second measurement electrodes may be selected to allow meaningful comparisons between the first and second measured voltages. For example, electrodes may be positioned on the material based on a symmetry of the material, so that each measured voltage is substantially the same when the material is intact, or both. As an example, a pair of drive electrodes may be positioned on a symmetry of the material, and the first measurement electrode and the second measurement electrode may be located symmetrically with reference to the symmetry. The symmetry may include, for example, a line, a plane, a curve, or a manifold for which a single mathematical operation made with reference to the symmetry maps the first electrode to the second electrode. As another example, a first pair of drive electrodes may be used to apply the electrical signal used to measure the first measured voltage via the first electrode, and a second pair of drive electrodes may be used to apply the electrical signal used to measure the second measured voltage via the second electrode. The first pair of drive electrodes may be symmetrical to the second pair of drive electrodes with reference to the symmetry, and the first measurement electrode may be symmetrical to the second measurement electrode with reference to the symmetry. As another example, a geometric configuration of the first pair of drive electrodes and the first measurement electrode, and the geometric configuration of the second pair of drive electrodes and the second, different measurement electrode may be selected so that, in the absence of a crack, the first measured voltage is substantially the same as the second measured voltage.

By utilizing comparisons between multiple voltage measurements from a material may allow determination of whether a material includes a crack or other defect without previous measurement of control voltages, which may simplify determination of whether the material includes the crack or other defect. Further, as the multiple voltage measurements are performed at substantially the same time (e.g., as part of a single set of measurements), the material may be expected to be at substantially the same temperature (e.g., the same temperature or nearly the same temperature). Thus, temperature may be less of a factor in the comparisons. This may be important for some materials, such as semiconductors, whose conductivity changes significantly as a function of temperature.

Other techniques also may be used to detect cracks in a material. For example, X-ray radiography or X-ray computed tomography (CT) may be used to detect cracks in a material. However, X-ray radiography and X-ray CT utilize relatively large, relatively expensive equipment to perform the crack detection. This may prevent X-ray radiography and X-ray CT from being portable, such as being used to test materials in the environments in which they are used. Moreover, X-ray radiography and X-ray CT may be relatively time consuming.

In contrast, a voltage measurement utilizes relatively smaller, relatively less expensive equipment. As such, the equipment may enable portable crack detection systems, which may be used to detect cracks in materials in situ rather than requiring removing the materials to be tested to the testing equipment.

FIG. 1 is conceptual and schematic diagram block illustrating an example system 10 for determining presence of a crack or other defect in a material 16 based on a comparison between at least a first measured voltage associated with the material and a second measured voltage associated with the material. System 10 of FIG. 1 includes a computing device 12, an electrical signal source 14, a plurality of electrodes 18A-18L (collectively, "electrodes 18"), a switch network 20, and an optional reference electrode 22. Electrodes 18 are electrically coupled to material 16, which is being tested using a four-point voltage measurement.

Material 16 may be any material for which detection of a potential crack or other defect is desired. In some examples, material 16 may be an electrically conductive or an electrically semiconductive material. For example, material 16 may include a metal, an alloy, a metalloid, a semiconductor, an electrically conductive or semiconductive ceramic, or the like. In some examples, material 16 may include a ceramic such as boron carbide ($B_4C$), silicon carbide (SiC), alumina ($Al_2O_3$), composites thereof, or the like.

Material 16 may be used in any one of a wide variety of applications. For example, material 16 may be a ceramic that has relatively high hardness, a relatively high Young's modulus, a relatively high tensile strength, and may be used in ceramic armor plating. Ceramic armor plating may be used in body armor for military and police personnel, vehicle armor, or the like. Example materials for ceramic armor plating include boron carbide ($B_4C$), silicon carbide (SiC), alumina ($Al_2O_3$), composites thereof, or the like.

Material 16 may define any geometry, and the geometry of material 16 may be based at least in part on the intended use for material 16. For example, ceramic armor plating may have a geometry defined by the surface that the armor plating will be applied to. Example geometries for material 16 include, but are not limited to, polygonal solids, such as rectangular solids or solids with more sides.

In some examples, material 16 may define a geometry that has a symmetry, i.e., is symmetric. As used herein, a symmetry is a point, line, plane, curve, or manifold, with reference to which a single mathematical operation maps each point of material 16 to another point of material 16. In the example of FIG. 1, material 16 includes a plane of symmetry 24, across which there is mirror symmetry. As described in further detail below, in some examples in which material 16 includes a symmetry, computing device 12 may compare voltages measured using electrodes or electrode pairs that are symmetrical with reference to the symmetry, e.g., plane of symmetry 24, to determine whether material 16 includes a crack or other defect.

Electrical signal source 14 may include any device configured to output an electrical signal to electrodes 18. The electrical signal may include an alternating current (AC) signal or a direct current (DC) signal. In some examples, electrical signal source 14 may output a current signal; in other examples, electrical signal source 14 may output a voltage signal. In some examples, electrical signal source 14 may include a power source, such as a battery, a capacitor, a supercapacitor, a transformer electrically connected to a mains voltage, or the like. In some examples, in addition to the power source, electrical signal source 14 may include analog or digital circuitry configured to receive the electrical signal from the power source and modify the electrical signal into a format suitable for output to electrodes 18.

Switch network 20 includes a plurality of inputs and a plurality of outputs, with respective inputs electrically coupled to each respective output by the network of switches. For example, switch network 20 may include a pair of inputs electrically coupled to electrical signal source 14, and at least a pair of inputs electrically coupled to computing device 32. Switch network 20 may include at least as many outputs are there are electrodes 18 and 22. For example, in the example shown in FIG. 1, system 10 includes thirteen electrodes, and switch network 20 thus includes at least thirteen outputs. Each electrode of electrodes 18 and reference electrode 22 is electrically coupled to a respective output of switch network 20.

Computing device 12 is configured to control operation of system 10, including electrical signal source 14 and switch network 20. Computing device 12 may include any of a wide range of devices, including computer servers, desktop computers, notebook (i.e., laptop) computers, tablet computers, and the like. In some examples, computing device 12 may include a processor. The processor may include one or more microprocessors, digital signal processors (DSP), application specific integrated circuits (ASIC), field programmable gate arrays (FPGA), or other digital logic circuitry. In some examples, computing device 12 may include an analog-to-digital converter (ADC), or system 10 may include an ADC separate from computing device 12. In examples in which the ADC is separate from computing device 12, the ADC may be electrically coupled between a selected measurement electrode and computing device 12. The ADC may measure the voltage using the selected measurement electrode, e.g., under control of computing device 12.

Computing device 12 is communicatively coupled to electrical signal source 14 and electrically coupled to switch network 20, e.g., either directly or indirectly via an external device, such as an ADC. Computing device 12 may be configured to control electrical signal source 14 to output an electrical signal, and may be configured to control switch network 20 to connect a selected pair of electrodes 18 to electrical signal source 14 to serve as a pair of drive electrodes, such that the electrical signal output by electrical signal source 14 is output to the pair of drive electrodes.

Computing device 12 is also configured to cause switch network 20 to connect a selected pair of electrodes 18 or one of electrodes 18 and reference electrode 22 to computing device 12 to serve as a pair of measurement electrodes. In this way, computing device 12 may determine a voltage across a pair of measurement electrodes in response to the electrical signal output by electrical signal source 14.

Electrodes 18 include a plurality of electrodes electrically coupled to material 16. In some examples, as shown in FIG. 1, each electrode of electrodes 18 is also electrically coupled to switch network 20. Each of electrodes 18 may be electrically connected to material 16 using any suitable type of electrical coupling, including, for example, an electrically conductive adhesive, an electrically conductive solder, embedding electrodes 18 in material 16, a dielectric coupling via capacitive coupling, or the like.

Electrodes 18 may be attached to any surface of material 16. The surface to which electrodes 18 are attached may affect the direction in which the electrical field extends and current flows within material 16. Cracks or other defects may affect the magnitude of the voltage more significantly when the electrical field and current flow extends across a plane of the crack (e.g., normal to a surface of the crack). As such, in some examples, the likely locations of cracks or other defects and the likely orientation of cracks or other defects within material 16 may be predicted based on the use for material 16. In some of these examples, electrodes 18 may then be attached to material 16 so that the electrical field and current flow within material 16 extends substantially normal to a predicted orientation of the crack or other defect.

In some examples, rather than predicting a location of the crack or other defect within material 16 and placing electrodes 18 based on the prediction, electrodes 18 may be attached to more than one surface of material 16. For example, if material 16 is in the shape of a cube, electrodes 18 may be attached to three orthogonal surfaces of the cube. By attaching a respective electrode of electrodes 18 to three orthogonal surfaces, the electrical field and current flow may be caused to extend in one of three orthogonal directions depending on the electrodes 18 through which the electrical signal is applied. This may increase a likelihood that induced the electrical field and current flow will extend within material 16 normal to the plane of any crack in material 16. Other examples are possible for other shapes. In some examples, electrodes 18 are distributed across a surface area of material 16, as shown in FIG. 1. In other examples, electrodes 18 are distributed around a perimeter of material 16. In some examples, plurality of electrodes 18 may be referred to as a set of N electrodes 18.

In some examples, electrodes 18 may be positioned on material 16 according to a selected geometric relationship, to achieve a selected relationship between voltages measured using electrodes 18, or both. For example, electrodes 18 may be positioned on material 16 so that each electrode of electrodes 18 is substantially symmetric to another one of electrodes 18 with reference to the symmetry of material 16. In the example of FIG. 1, first electrode 18A is substantially symmetric to sixth electrode 18F with reference to plane of symmetry 24, second electrode 18B is substantially symmetric to fifth electrode 18D with reference to plane of symmetry 24, third electrode 18C is substantially symmetric to fourth electrode 18D with reference to plane of symmetry 24, seventh electrode 18G is substantially symmetric to twelfth electrode 18L with reference to plane of symmetry 24, eighth electrode 18H is substantially symmetric to eleventh electrode 18K with reference to plane of symmetry 24, and ninth electrode 18I is substantially symmetric to tenth electrode 18J with reference to plane of symmetry 24.

As another example, electrodes 18 may be positioned on material 16 so that a respective pair of electrodes is substantially symmetric to another respective pair of electrodes 18 with reference to the symmetry of material 16. For example, a first pair of electrodes may include first electrode 18A and twelfth electrode 18L and a second pair of electrodes may include sixth electrode 18F and seventh electrode 18G. The first pair of electrodes is symmetric to the second pair of electrodes with reference to plane of symmetry 24. Similarly, a third pair of electrodes may include second electrode 18B and eleventh electrode 18K and a fourth pair of electrodes may include fifth electrode 18E and eighth electrode 18H. The third pair of electrodes is symmetric to the fourth pair of electrodes with reference to plane of symmetry 24. Additionally, a fifth pair of electrodes may include third electrode 18C and tenth electrode 18J and a sixth pair of electrodes may include fourth electrode 18D and ninth electrode 18I. The fifth pair of electrodes is symmetric to the sixth pair of electrodes with reference to plane of symmetry 24.

In some examples, electrodes 18 may be positioned on material 16 so that each respective pair of electrodes is substantially symmetric to another respective pair of electrodes 18 with reference to the symmetry of material 16. This may be accomplished in examples in which each electrode of electrodes 18 is substantially symmetric to another one of electrodes 18 with reference to the symmetry of material 16, and a respective electrode of two symmetric electrodes is used in each respective pair of electrodes in a symmetric pair of electrodes.

Figure 2:
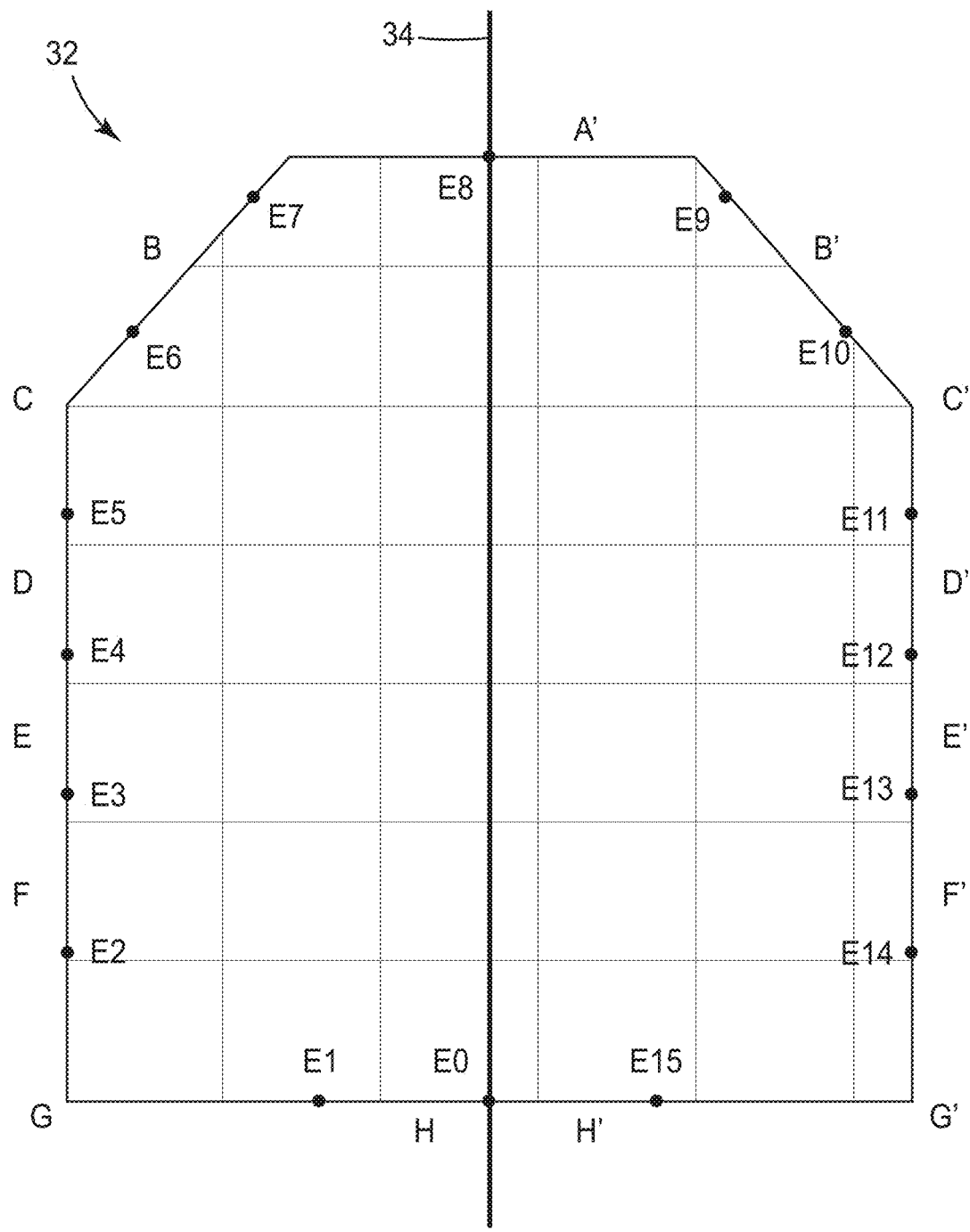
FIG. 2 is a conceptual diagram illustrating an example material and arrangement of electrodes on the material.

Although not shown in FIG. 1, in some examples, two electrodes may be positioned on the symmetry of material 16, e.g., on plane of symmetry 24 shown in FIG. 1. For example, FIG. 2 is a conceptual diagram illustrating an example material 32 and arrangement of electrodes E0-E15 on material 32. Material 32 includes a plane of symmetry 34. Two electrodes, E0 and E8, are positioned on plane of symmetry 34 at opposite ends of material 32. The remainder of electrodes E0-E15 are positioned on material 32 so that an equal number of electrodes are on each side of plane of symmetry 34 and each respective electrode on one side of plane of symmetry 34 is symmetric to a respective electrode on the other side of plane of symmetry 34. For example, electrodes E7 and E9 are symmetric with reference to plane of symmetry 34, electrodes E6 and E10 are symmetric with reference to plane of symmetry 34, electrodes E5 and E11 are symmetric with reference to plane of symmetry 34, electrodes E4 and E12 are symmetric with reference to plane of symmetry 34, electrodes E3 and E13 are symmetric with reference to plane of symmetry 34, electrodes E2 and E14 are symmetric with reference to plane of symmetry 34, and electrodes E1 and E15 are symmetric with reference to plane of symmetry 34.

FIG. 2 also includes labels for gaps between respective electrodes of electrodes E0-E15. For example, the gap from E0 to D1 is labeled H, the gap from E1 to E2 is labeled G, the gap from E2 to E3 is labeled F, the gap from E3 to E4 is labeled E, the gap from E4 to E5 is labeled D, the gap from E5 to E6 is labeled C, the gap from E6 to E7 is labeled B, and the bap from E7 to E8 is labeled A. The mirror image gaps on the right side of plane of symmetry 34 are labeled with similar letters and a prime designation. As electrodes E0-E15 are placed symmetrically with reference to plane of symmetry 34, voltages measured for corresponding gaps on opposite sides of plane of symmetry 34 may be substantially the same in the absence of a crack or defect in material 32, assuming that electrodes E0 and E8 are used as the pair of drive electrodes, or that two pairs of drive electrodes that are symmetric to each other with reference to line of symmetry 34 are used during measurement of the voltages.

Positioning electrodes 18 to be exactly symmetrical may be difficult to achieve in practice. Hence, electrodes 18 may be positioned to be substantially symmetrical. As used here, substantially symmetrical means that the electrodes are placed approximately symmetrical with reference to a symmetry of material 16, e.g., within about 0.5 mm of being symmetric, within about 0.2 mm of being symmetric or within about 0.1 mm of being symmetric.

In some examples, rather than electrodes 18 being positioned based on symmetry of material, electrodes 18 may be positioned to achieve a selected relationship between voltages measured using electrodes 18. For example, electrodes 18 may be positioned to achieve measurement of a substantially similar voltage (e.g., the same or nearly the same voltage) in the absence of a crack or other defect. In some examples, this may include positioning respective groups of electrodes to achieve measurement of a substantially similar voltage (e.g., the same or nearly the same voltage) in the absence of a crack or other defect. Each respective group of electrodes may include a pair of drive electrodes and one or two measurement electrodes. For example, a group of electrodes may include a pair of drive electrodes separated by one or two measurement electrodes. Using electrodes 18 shown in FIG. 1, an example of this configuration may include a pair of drive electrodes that includes first electrode 18A and fourth electrode 18D, and a pair of measurement electrodes that includes second electrode 18B and third electrode 18C. Another example of this configuration may include a pair of drive electrodes that includes first electrode 18A and third electrode 18C, and a measurement electrode that includes second electrode 18B (to measure a single-ended voltage using second electrode 18B and reference electrode 22).

In some examples, each group of electrodes may not share any electrodes with each other group of electrodes. In other examples, each group of electrodes may share one or more electrodes with another group of electrodes. For example, a first group of electrodes may include first electrode 18A and fourth electrode 18D as a pair of drive electrodes, and may include second electrode 8B and third electrode 18C as a pair of drive electrodes. A second group of electrodes may include second electrode 18B and fifth electrode 18E as a pair of drive electrodes, and third electrode 18C and fourth electrode 18D as a pair of measurement electrodes. In other words, each group of electrodes may include four electrodes, the two outer electrodes being drive electrodes and the two inner electrodes being measurement electrodes. Each respective group of electrodes may be formed by four adjacent electrodes, and each subsequent group may be formed by shifting the group to an adjacent electrode in a selected pattern (e.g., left or right, clockwise or counter-clockwise, or the like). In some examples, the number of groups of electrodes may equal the number of electrodes 18. In examples such as this, the placement of each electrode of electrodes 18 may be selected so that the voltage measured using each respective group of electrodes is substantially the same as the voltage measured using each other respective group of electrodes.

In some examples, positioning electrodes 18 so that the voltage measured using each respective group of electrodes is exactly the same as the voltage measured using each other respective group of electrodes may be difficult to achieve in practice. Hence, electrodes 18 may be positioned to be so that the voltage measured using each respective group of electrodes is substantially the same as the voltage measured using each other respective group of electrodes. As used here, substantially the same means that the electrodes are placed so that the voltage measured using each respective group of electrodes is within a threshold amount as the voltage measured using each other respective group of electrodes in the absence of a crack or defect in material 16.

The threshold amount may be a predetermined percentage of the measured voltage, such as, for example, 20%, 10%, 5%, or 1%.

In some examples, electrodes 18 may be positioned so that the voltage measured using each respective group of electrodes is substantially the same as the voltage measured using each other respective group of electrodes by using experimental iteration. For example, a first group of electrodes may be positioned based on geometry of material 16 to accomplish current distribution within a selected volume of material 16. For instance, the first group of electrodes may be positioned near a corner or edge of material 16 to improve uniform current distribution throughout material 16 near the corner or edge. Each subsequent electrode 18 or group of electrodes 18 may be positioned so that the voltage measured using the group or groups of electrodes of which the electrode is a part is substantially the same as the voltage measured using the first group. If, on first positioning of the subsequent electrode 18 or group of electrodes 18, the voltage measured using the subsequent electrode 18 or group of electrodes 18 is not substantially the same as the voltage measured using the first group of electrodes, the subsequent electrode 18 or group of electrodes 18 may be repositioned to achieve a more similar voltage measurement. This process may be repeated for each subsequent electrode of electrodes 18.

In other examples, instead of using experimental positioning, the placement of electrodes 18 may be determined (e.g., by computing device 12 or another computing device) using a physics-based simulation tool. For example, computing device 12 may be programmed with a finite element model (FEM) of material 16 which implements the physics-based simulation. The FEM of material 16 may include substantially accurate (e.g., accurate or approximately accurate) geometry of material 16 (e.g., the shape and volume of material 16), and also may include locations of electrodes 18 attached to material 16. In some examples, the FEM of material 16 may additionally include representative properties of material 16, including, for example, conductivity, resistivity, other related electrical properties, and the like. The FEM of material 16 may include representative properties of material 16 for each respective node representing material 16. For each group of electrodes, computing device 12 may simulate applying an electrical signal to a respective pair of drive electrodes and determine a simulated measured voltage using a respective pair of measurement electrodes. Computing device 12 may compare measured voltages from adjacent groups of electrodes, and adjust positioning of one or more of electrodes 18 based on the comparison. Computing device 12 may iterate this process until each measured voltage is within a threshold amount, e.g., 20%, 10%, 5%, 1%, or the like. The positions of electrodes 18 determined by computing device 12 then may be used to place electrodes 18 on material 16.

In some examples, electrodes 18 may be positioned on material 16 to satisfy both symmetry and substantially equal measured voltages. To accomplish this, the following technique may be used in some examples. The technique may be implemented either experimentally, e.g., using system 10 of FIG. 1, or theoretically, e.g., using the physics-based model described above. First, two of electrodes 18 may be positioned on the symmetry of material 16, e.g., on plane of symmetry 24 shown in FIG. 1. An equal number of electrodes 18 then may be positioned on either side of the symmetry of material 16, such that the additional electrodes 18 result in symmetry of electrodes 18 with reference to the symmetry of material 16.

Computing device 12 then may determine measured voltages for each group of electrodes. In some examples, electrodes 18 may be numbered sequentially around the perimeter of material 16, e.g., first electrode 18A is 1, second electrode 18B is 2, third electrode 18C is 3, and the like. For each integer 1 to N, where N is the number of electrodes (12 in the example of FIG. 1), a group of electrodes may include a pair of drive electrodes X and X+3, and a pair of measurement electrodes X+1 and X+2. There may be the same number of groups of electrodes as electrodes 18, such that the groups of electrodes eventually wrap around the perimeter of material 16. Thus, computing device may determine the same number of measured voltages as there are electrodes 18 (12 in the example of FIG. 1).

Computing device 12 then may determine a minimum measured voltage for the 12 measured voltages and determine the electrode numbers of the pair of measurement electrodes associated with the minimum voltage. Computing device 12 also may determine the measured voltages for the pairs of measurement electrodes on either side of the pair of measurement electrodes associated with the minimum measured voltage. For example, if the minimum measured voltage is between third electrode 18C and fourth electrode 18D, computing device 12 may determine the measured voltage between second electrode 18B and third electrode 18C, and the measured voltage between fourth electrode 18D and fifth electrode 18E. Computing device 12 may determine which voltage between the measured voltages on either side of the minimum measured voltage is larger. Computing device 12 then may identify the common electrode from the pair of electrodes associated with the minimum measured voltage and the pair of electrodes associated with the larger measured voltage between the pairs of measurement electrodes on either side of the pair of measurement electrodes associated with the minimum measured voltage. In examples in which computing device 12 is determining the position of electrodes using the physics-based model, computing device 12 may move the common electrode away from the other electrode in the pair of electrodes associated with the minimum value by a predetermined distance. In examples in which positioning of electrodes 18 is being determined experimentally, computing device 12 may output the measured voltages and associated pairs of measurement electrodes determined in this technique, or may output an indication of the electrode to be moved, and an operator may move the electrode on material 16 by the predetermined distance. Further, as electrodes 18 are positioned symmetrically on material 16, the electrode that is symmetric to the electrode that is moved also may be moved to maintain symmetry of electrodes 18.

Computing device 12 may repeat these steps until all measured voltages are within a threshold amount of each other (e.g., 20%, 10%, 5%, or 1%), or until improvement in similarity of the measured voltages falls below a threshold amount (e.g., 0.1% or the like).

In some examples, system 10 may optionally include reference electrode 22, which may not be electrically coupled to material 16 and may be used for single-ended voltage measurements between one electrode of plurality of electrodes 18 and reference electrode 22. Reference electrode 22 may be at a selected voltage, such a ground or an offset voltage. In some examples, computing device 12 may use the single-ended voltages in the techniques described herein to determine whether material 16 includes a crack or other defect. In other examples, computing device 12 may determine differential voltages between two electrodes electrically coupled to material 16 by comparing (e.g., subtracting) single ended voltages associated with the two electrodes, and computing device 12 may use these differential voltages in the techniques described herein to determine whether material 16 includes a crack or other defect. In still other examples, computing device 12 may determine a voltage between two of electrodes 18 directly, e.g., without first determining two single-ended voltages.

By positioning electrodes 18 according to a selected geometric relationship, to achieve a selected relationship between voltages measured using electrodes 18, or both, computing device 12 may determine whether material 16 includes a crack or other defect based on a comparison between at least a first measured voltage associated with material 16 and a second measured voltage associated with material 16. The first and second measured voltages may be measured during a single set of measurements, e.g., at substantially the same time. This may optionally allow determination of whether material 16 includes a crack or defect without previous measurement of control voltages, may, in some examples, provide a large number of measured voltages to which any measured voltage may be compared, or the like. This may simplify determination of whether material 16 includes the crack or other defect, may improve accuracy (e.g., increase true positives, increase true negatives, decrease false positives, decrease false negatives, or combinations thereof) of detection of cracks or other defects, or the like. Further, as the multiple voltage measurements are performed at substantially the same time (e.g., as part of a single set of measurements), the material may be expected to be at substantially the same temperature (e.g., the same temperature or nearly the same temperature). Thus, temperature may be less of a factor in the comparisons. This may be important for some materials, such as semiconductors, whose conductivity changes significantly as a function of temperature.

Figure 3:
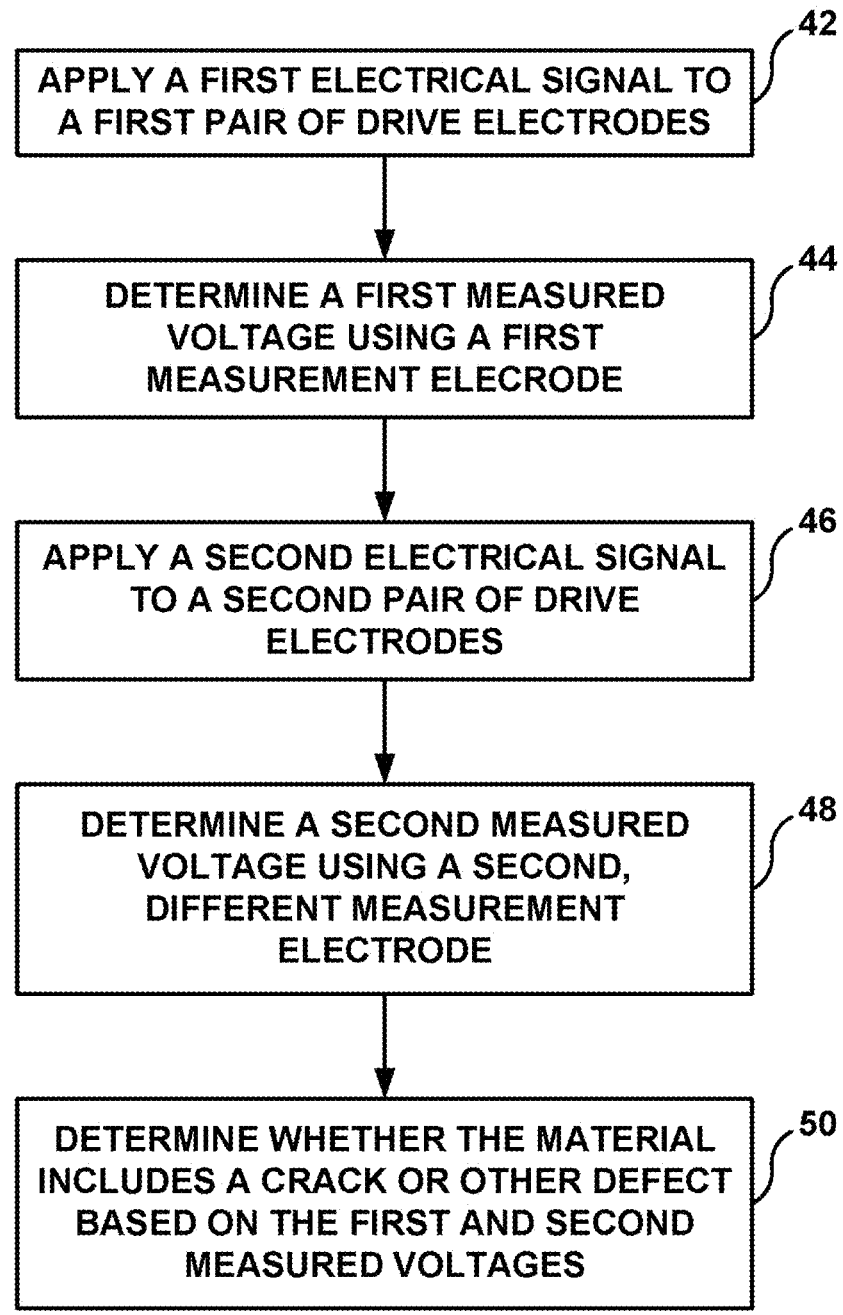
FIG. 3 is a flow diagram illustrating an example technique for determining whether a material includes a crack or other defect based on a comparison between at least a first measured voltage associated with the material and a second measured voltage associated with the material.

FIG. 3 is a flow diagram illustrating an example technique for determining whether a material includes a crack or other defect based on a comparison between at least a first measured voltage associated with the material and a second measured voltage associated with the material. The technique of FIG. 3 will be described with concurrent reference to system 10 of FIG. 1, but it will be understood that other systems that include more or fewer components than system 10 may perform the technique of FIG. 3 (e.g., a system that includes only computing device 12), and that system 10 may be used to perform other techniques (e.g., the techniques of FIGS. 4 and 5, among other techniques).

The technique of FIG. 3 may include applying a first electrical signal to a first pair of drive electrodes (42). For example, computing device 12 may cause switch network 20 to electrically couple a pair of electrodes 18 to electrical signal source 14 as a pair of drive electrodes. Computing device 12 then may cause electrical signal source 14 to output an electrical signal, such as a current signal or a voltage signal, which is conducted across material 16 between the pair of drive electrodes 18.

The technique of FIG. 3 also includes determining, by computing device 12, a first measured voltage using a first measurement electrode (44). To determine the first measured voltage using the first measurement electrode (44), computing device 12 may cause switch network 20 to electrically couple a pair of electrodes to computing device 12 (or another device, such as an ADC) to be a pair of measurement electrodes. As described above, in some examples, the pair of measurement electrodes may include two of electrodes 18, each of which is not a drive electrode. In some examples, the two of electrodes 18 may be physically adjacent to each other on material 16.

In other examples, the pair of measurement electrodes may include reference electrode 22 and one of electrodes 18. In examples in which the pair of measurement electrodes includes reference electrode 22 and one of electrodes 18, computing device 12 may determine the first measured voltage between reference electrode 22 and a first one of electrodes 18. In still other examples, computing device 12 may cause switch network 20 to connect a first electrode of electrodes 18 and reference electrode 22 to computing device 12 (or another device, such as an ADC) to be a first pair of measurement electrodes, may measure a first voltage using the first electrode and reference electrode 22, may cause switch network 20 to connect a second electrode of electrodes 18 and reference electrode 22 to computing device 12 (or another device, such as an ADC) to be a second pair of measurement electrodes, may measure a second voltage using the first electrode and reference electrode 22, and may determine a difference between the first voltage and the second voltage to determine the first measured voltage. Regardless of the particular implementation, computing device 12 may determine a voltage between the measurement electrodes while electrical signal source 14 is applying the electrical signal to material 16 via the pair of drive electrodes.

The technique of FIG. 3 also includes applying a second electrical signal to a second pair of drive electrodes (46). For example, computing device 12 may cause switch network 20 to electrically couple a pair of electrodes 18 to electrical signal source 14 as a pair of drive electrodes. Computing device 12 then may cause electrical signal source 14 to output an electrical signal, such as a current signal or a voltage signal, which is conducted across material 16 between the pair of drive electrodes 18. In some examples, the first pair of drive electrodes and the second pair of drive electrodes may be the same. For example, both of the pairs of drive electrodes may be on a plane of symmetry 24 of material 16 (e.g., as are electrodes E0 and E8 in FIG. 2). In other examples, the first pair of drive electrode and the second pair of drive electrodes may be different.

The technique of FIG. 3 also includes determining, by computing device 12, a second measured voltage using a second measurement electrode (44). The second measurement electrode may be different than the first measurement electrode. Computing device 12 may determine the second measured voltage using any of the techniques described above with reference to the first measured voltage.

In some examples, the geometrical configuration of the first pair of drive electrodes, the second pair of drive electrodes, the first measurement electrode, and the second measurement electrode may be selected to allow meaningful comparisons between the first measured voltage and the second measured voltage. For example, the first pair of drive electrodes and the second pair of drive electrodes may be the same pair of electrodes, and may be positioned on the symmetry of material 16, e.g., on plane of symmetry 24. The first measurement electrode and second measurement electrode may be positioned symmetrically with reference to the symmetry of material 16, e.g., with reference to plane of symmetry 24. In such example, the first measured voltage and the second measured voltage should be substantially the same (e.g., the same or nearly the same) in the absence of a crack or other defect in material 16. For example, in the absence of a crack or defect in material 16, the first voltage and the second voltage may be within a predetermined percentage of each other, such as, for example, within about 20%, 10%, 5%, or 1% of each other.

As another example, the first pair of drive electrodes and the second pair of drive electrodes may be the different than each other. The first pair of drive electrodes and the first measurement electrode are a first group of electrodes and the second pair of drive electrodes and the second measurement electrode are a second group of electrodes. The first and second group of electrodes may be symmetric with each other relative to the symmetry of material 16, e.g., plane of symmetry 24. For example, the first group of electrodes may include a pair of drive electrodes that includes first electrode 18A and third electrode 18C and a measurement electrode that is second electrode 18B, and the second group of electrodes may include a pair of drive electrodes that includes fourth electrode 18D and sixth electrode 18F and a measurement electrode that is fifth electrode 18E. The first group of electrodes is symmetric to the second group of electrodes with reference to plane of symmetry 24. As such, in the absence of a crack or other defect in material 16 the first measured voltage and the second measured voltage should be substantially the same (e.g., the same or nearly the same).

As a further example, electrodes 18 may be positioned so that, for each group that includes a pair of drive electrodes and a measurement electrode, the measured voltage in the absence of a crack or other defect is substantially the same. The respective groups of electrodes may or may not be symmetric to another group of electrodes, and material 16 may or may not include a symmetry. As such, regardless of the groups of electrodes selected as the first group of electrodes and the second group of electrodes, in the absence of a crack or other defect in material 16 the first measured voltage and the second measured voltage may be substantially the same (e.g., the same or nearly the same).

The technique of FIG. 3 also includes determining, by computing device 12, whether material 16 includes a crack or other defect based on the first and second measured voltages (50). As described above, because of how electrodes 18 are placed and how computing device 12 selects pairs of drive electrodes and measurement electrodes, the first and second measured voltages are substantially the same in the absence of a crack or other defect in material 16. As such, computing device 12 may compare the first measured voltage and the second measured voltage, and, in response to the first and second measured voltages being substantially the same (e.g., within a threshold amount of each other) may determine that material 16 does not include a crack or other defect. On the other hand, in response to the first and second measured voltages not being substantially the same (e.g., different than each other by more than a threshold amount), computing device 12 may determine that material 16 includes a crack or other defect. The threshold amount may be the same or slightly greater than the threshold amount used to determine the position of electrodes 18. For example, the threshold amount may be 1%, 5%, 10%, 20%, or the like. Computing device 12 may compare the first and second measured voltages by subtracting one of the first or second measured voltages from the other of the first or second measured voltages, by taking a ratio of one of the first or second measured voltages from the other of the first or second measured voltages, or the like, and then determining a percentage difference between the first or second measured voltages.

In some examples, in addition to comparing the first and second measured voltages, computing device 12 may utilize control voltages to determine whether material 16 includes a crack or other defect based on the first and second measured voltages (50). The control voltage may represent the voltage measured for a give combination of pair of drive electrodes and measurement electrode when material 16 does not include a crack or other defect. The control voltage may be based on material 16, a model, or an average of a plurality of materials that are similar to or substantially the same as material 16. For example, computing device 12 or another similar computing device may determine the control voltage at a time at which material 16 is manufactured, or a time at which an independent measurement (e.g., X-ray radiology or X-ray CT scan) may be used to verify that material 16 is intact, undamaged, or does not include a crack. Computing device 12 or the other similar computing device may determine by control voltage by applying the electrical signal to a pair of drive electrodes from electrodes 18 and determining the measured voltage using a measurement electrode. In some examples, the control voltages may be determined using similar or substantially the same combinations of pairs of drive electrodes and measurement electrodes as are used to determine the measured voltages described above.

In other examples, the control voltage may be determined using a model of the material in an intact (undamaged) state. For example, computing device 12 may execute the model of material 16 and determine the control voltage based on the model. In some examples, the model may include a physics-based model of the electrical properties of material 16. In some other examples, the control voltage may be determined as an average (e.g., mean) of a plurality of similar materials (e.g., in geometry and composition) that are known to be intact (undamaged). This control voltage may be stored (e.g., in a memory device associated with computing device 12) for later use.

In examples in which computing device 12 utilizes control voltages, computing device 12 may first compare the first measured voltage to a first control voltage and compare the second measured voltage to a second control voltage. The first control voltage may be associated with the same combination of drive electrodes and measurement electrode as the first measured voltage, and the second control voltage may be associated with the same combination of drive electrodes and measurement electrode as the second measured voltage. The comparison between the respective measured voltage and the respective control voltage may include subtracting the respective control voltage from the respective measured voltage or dividing by respective measured voltage by the respective control voltage. By utilizing control voltages in this manner, the technique may account for variations between the respective voltages that exist even in the absence of cracks or other defects. For example, as described above, the first and second voltage may be within a threshold amount of each other in the absence of a crack or other defect, but this threshold amount may be, in some examples, as large as about 20%. Hence, there may still be variations between voltages even if the absence of cracks or other defects. As the control voltages represent electrical behavior of material 16 in the absence of cracks or other defects, the control voltages may help account for the variations in voltages between measurement electrodes or groups of electrodes.

After the respective measured voltages have been compared to the respective control voltages, the results of the respective comparisons (e.g., the differences or ratios) may be compared to determine whether material 16 includes a crack or other defect according to the techniques described above.

Figure 4:
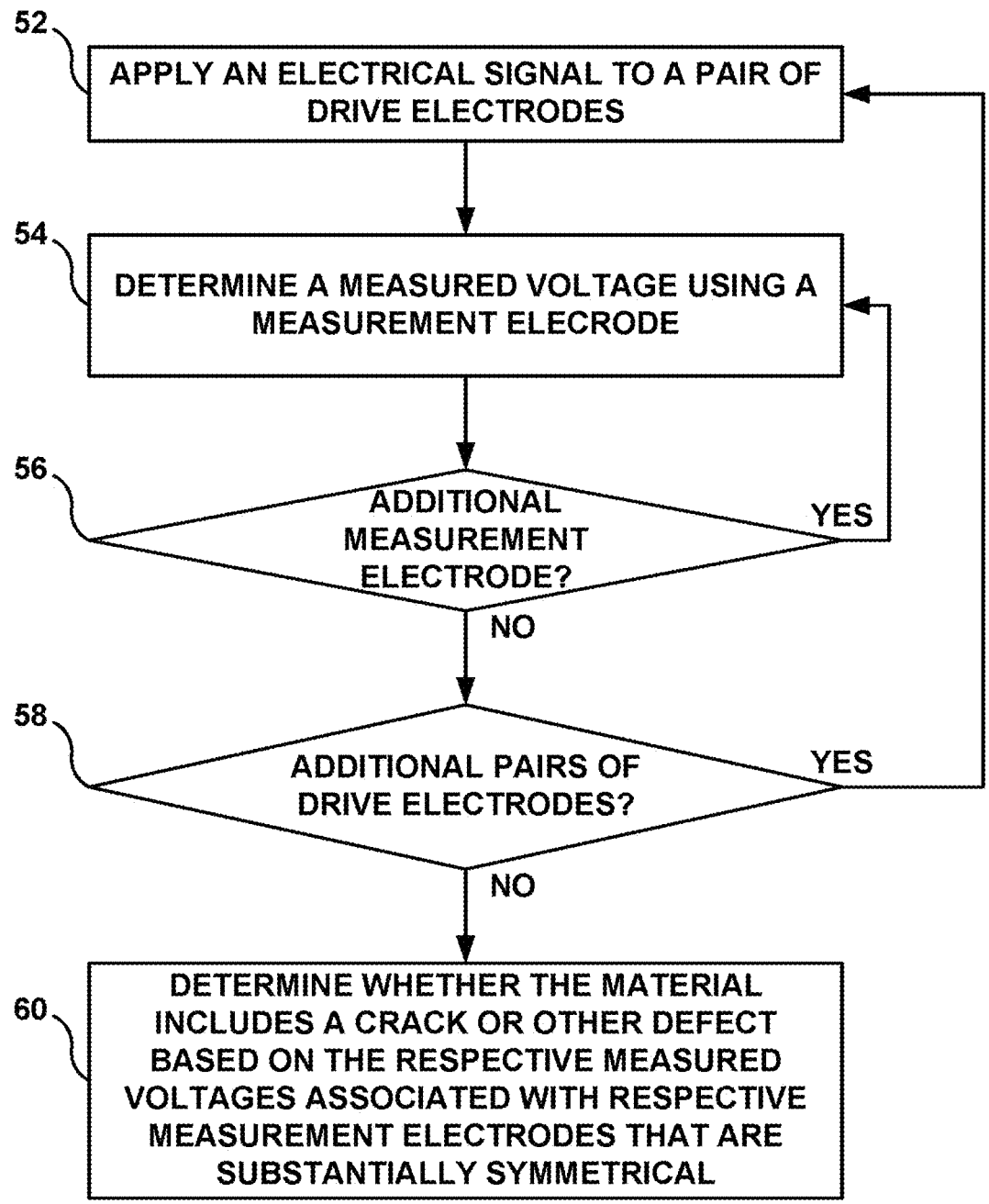
FIGS. 4 and 5 are flow diagrams illustrating example techniques for determining whether a material includes a crack or other defect based on a comparison between at least a first measured voltage associated with the material and a second measured voltage associated with the material.

FIG. 4 is a flow diagram illustrating another example technique for determining whether a material includes a crack or other defect based on a comparison between at least a first measured voltage associated with the material and a second measured voltage associated with the material. The technique of FIG. 4 will be described with concurrent reference to system 10 of FIG. 1, but it will be understood that other systems that include more or fewer components than system 10 may perform the technique of FIG. 4 (e.g., a system that includes only computing device 12), and that system 10 may be used to perform other techniques (e.g., the techniques of FIGS. 3 and 5, among other techniques).

The technique of FIG. 4 includes applying an electrical signal to a first pair of drive electrodes electrically coupled to material 16 (52). For example, computing device 12 may cause switch network 20 to electrically couple electrical signal source 14 to a selected pair of electrodes 18, which serves as a pair of drive electrodes. The selected pair of electrodes 18 may include any two electrodes of electrodes 18. In some examples, the selected pair of electrodes 18 may be adjacent to each other; in other examples, the selected pair of electrodes may be spaced apart. For example, in some instances, the selected pair of electrodes 18 may be substantially opposite each other in the array of electrodes, e.g., electrode 18A and electrode 18L or electrode 18F and electrode 18G, or may be separated by a predetermined number of electrodes 18, e.g., separated by two electrodes of electrodes 18. In some examples, the pair of electrodes 18 may include two electrodes that are disposed on a symmetry of material 16, e.g., electrodes E0 and E8 disposed on plane of symmetry 34 in FIG. 2.

Computing device 12 then may cause electrical signal source 14 to apply the electrical signal to the first pair of drive electrodes electrically coupled to material 16 (52), e.g., via switch network 20. The electrical signal may include an AC signal or a DC signal, and may include a current signal or a voltage signal. In some examples, the type of electrical signal may depend on the composition of material 16. For example, a DC signal may be used to measure a voltage of an electrically conductive or electrically semiconductive material, while an AC signal may be used to measure a voltage of an electrically conductive material, an electrically semiconductive material, or a dielectric material. Computing device 12 also may control electrical signal source 14 to generate the predetermined electrical signal with a selected amplitude, duration, frequency, and other signal characteristics.

The technique of FIG. 4 also includes, while applying the electrical signal to the first pair of drive electrodes, determining a measured voltage using a measurement electrode electrically coupled to material 16 (54). For example, computing device 12 may cause switch network 20 to electrically couple computing device 12 to a selected pair of measurement electrodes. The selected pair of measurement electrodes may be any two electrodes from electrodes 18, neither of which is being used as one of the electrodes in the drive pair of electrodes, or may be reference electrode 22 and any one of electrodes 18 that is not being used as one of the electrodes in the drive pair of electrodes. In some examples, the two electrodes in the pair of measurement electrodes may be adjacent to each other, e.g., electrode 18B and electrode 18C, or electrode 18D and electrode 18J. In other examples, the two electrodes in the pair of measurement electrodes may be spaced each other with one or more electrodes between, e.g., electrode 18B and electrode 18D, or electrode 18E and electrode 18H. Using adjacent electrodes as the pair of measurement electrodes may result in a higher signal-noise-ratio in the voltage measurement, but may reduce an area of material 16 for which the voltage is measured. Regardless of the particular electrodes coupled to computing device 12, computing device 12 may determine a voltage using the measurement electrode (54) while electrical signal source 14 is applying the electrical signal to the selected pair of drive electrodes (52).

In some examples, computing device 12 may be configured to determine a respective measured voltage for a plurality of measurement electrodes for each pair of drive electrodes. Hence, in some examples, the technique of FIG. 4 further includes determining whether there is an additional measurement electrode for which to determine a measured voltage (56) for the selected pair of drive electrodes. In response to determining that there is an additional electrode to be used as a measurement electrode (the "YES" branch of decision block 56), computing device 12 may cause switch network 20 to couple the selected electrode to computing device 12. Computing device 12 then may determine a measured voltage using the selected measurement electrode (54).

Computing device 12 may repeat this determination (56), coupling of a selected measurement electrode to computing device 12 using switch network 20, and determination of a respective measured voltage (54) until computing device 12 determines there are no additional electrodes 18 to be used as a measurement electrode for the selected pair of drive electrodes (the "NO" branch of decision block 56).

In some examples, the technique of FIG. 4 optionally includes determining, by computing device 12, whether there is an additional pair of drive electrodes to which to apply the electrical signal (58). For example, computing device 12 may be configured to utilize each unique pair of electrodes or each unique pair of electrodes separated by a predetermined number of electrodes (e.g., two electrodes) as a pair of drive electrodes. In other examples, only a single pair of electrodes 18 may be utilized as a pair of drive electrodes, and the technique of FIG. 4 may not include determining, by computing device 12, whether there is an additional pair of drive electrodes to which to apply the electrical signal (58).

In examples in which the technique of FIG. 4 includes determining, by computing device 12, whether there is an additional pair of drive electrodes to which to apply the electrical signal (58), upon selecting a new pair of drive electrodes (the "YES" branch of decision block 58), computing device 12 may control switch network 20 to electrically couple the selected pair of drive electrodes to electrical signal source 14. Computing device 12 then may cause electrical signal source 14 to apply the electrical signal to the new selected pair of drive electrodes (52). Computing device then may cause switch network 20 to electrically couple computing device 12 to a selected measurement electrode, and may determine a respective measured voltage using the selected measurement electrode (54). Again, computing device 12 may determine whether there is an additional measurement electrode with which to measure a measured voltage (56) for the selected pair of drive electrodes. In response to determining that there is an additional electrode to be used as a measurement electrode (the "YES" branch of decision block 56) for the selected pair of drive electrodes, computing device 12 may control switch network 20 to couple the selected electrode to computing device 12 as a measurement electrode. Computing device 12 then may determine a measured voltage using the selected measurement electrode. Computing device 12 may repeat this determination (56), coupling of selected measurement electrodes to computing device 12 using switch network 20, and determination of a respective measured voltage (54) until computing device 12 determines there are no additional electrodes 18 to be used as measurement electrodes for the selected pair of drive electrodes (the "NO" branch of decision block 56).

Computing device 12 then may determine whether there is an additional pair of electrodes 18 to be used as a pair of drive electrodes (58). Computing device 12 may repeat this algorithm until computing device 12 determines there are no more additional pairs of electrodes 18 to be used as a pair of drive electrodes (the "NO" branch of decision block 58).

Once computing device 12 has determined that there are no additional pairs of electrodes 18 to be used as a pair of drive electrodes (the "NO" branch of decision block 58), computing device 12 may determine whether material 16 includes a crack or other defect based on respective measured voltages associated with respective measurement electrodes that are substantially symmetrical with reference to the symmetry of material 16 (60).

For example, referring to FIG. 2, electrodes E0 and E8 may be used the only pair of drive electrodes, and computing device 12 may determine measurement voltages for each of electrodes E1-E7 and E9-E15. Computing device 12 may utilize single-ended voltages associated with each respective electrode of electrodes E1-E7 and E9-E15, may determine differential voltages between adjacent electrodes of electrodes E1-E7 and E9-E15, or may directly measure differential voltages between adjacent electrodes of electrodes E1-E7 and E9-E15. In some examples, computing device 12 also may measure or determine voltages between E15 and E), between E0 and E1, between E7 and E8, and between E8 and E9.

Computing device 12 then may compare respective measured voltages associated with respective measurement electrodes or respective measurement electrode pairs that are symmetric with reference to plane of symmetry 34. For example, computing device 12 may compare the measured voltage associated with E1 and the measured voltage associated with E15, as E1 and E15 are symmetric with reference to plane of symmetry 34. Similarly, in examples in which computing device 12 measures or determines differential voltages, computing device 12 may compare a measured voltage associated with electrode pair E1 and E2 and a measured voltage associated with electrode pair E15 and E14. Material 32 includes a number of symmetric electrodes or electrode pairs, and computing device 12 may compare at least some voltages associated with symmetric electrodes or electrode pairs or all voltages associated with symmetric electrodes or electrode pairs to determine whether material 16 or 32 includes a crack or other defect.

In some examples, rather than using only a pair of electrodes on the symmetry of material 16 as drive electrodes, computing device 12 may cause a plurality of pairs of electrodes to be used as drive electrodes, as described above. In some examples, computing device 12 may cause pairs of drive electrodes that are symmetric with reference to the symmetry of material 16 or 32 to be used as drive electrodes, and for each pair of drive electrodes, may cause measurement electrodes that are symmetric to be used to measure voltages. For example, again with reference to FIG. 2, computing device 12 may cause electrodes E2 and E5 to be used as a pair of drive electrodes. For E2 an E5 as the pair of drive electrodes, computing device 12 may cause one or more electrodes or pairs of electrodes to be used as the measurement electrode (or pair of measurement electrodes). For example, computing device 12 may cause E3 and E4 to be used as a pair of measurement electrodes, and, optionally, may cause at least some other (e.g., all other) adjacent pairs of electrodes (other than pairs of adjacent electrodes that include electrodes E2 and E5) to be used as pairs of measurement electrodes. As computing device 12 caused electrodes E2 and E5 to be used as a pair of drive electrodes, computing device 12 also may cause electrodes E14 and E11 to be used as a pair of drive electrodes, since electrodes E14 and E11 are symmetric to electrodes E2 and E5 with reference to plane of symmetry 34. Computing device 12 may cause electrodes or pairs of electrodes that are symmetric to those used to measure voltages when electrodes E2 and E5 were used as the pair of drive electrodes to be used as measurement electrodes or pairs of measurement electrodes.

In some examples, computing device 12 may repeat this technique for each of a plurality of pairs of drive electrodes, each pair of drive electrodes being symmetric to another pair of drive electrodes with reference to the symmetry of material 16 or 32 (e.g., plane of symmetry 24 or 34). Computing device 12 then may determine whether material 16 includes a crack or other defect by comparing respective measured voltages associated with respective measurement electrodes that are substantially symmetrical with reference to the symmetry of material 16 and for which respective pairs of drive electrodes that are symmetric to each other with reference to the symmetry of material 16 were used.

For each respective comparison, computing device 12 may compare a first respective measured voltage and a second respective measured voltage, and, in response to the first and second measured voltages being substantially the same (e.g., within a threshold amount of each other) may determine that the comparison indicates that material 16 does not include a crack or other defect. On the other hand, in response to the first and second measured voltages not being substantially the same (e.g., different than each other by more than a threshold amount), computing device 12 may determine the comparison indicates that material 16 includes a crack or other defect. The threshold amount may be the same or slightly greater than the threshold amount used to determine the position of electrodes 18. For example, the threshold amount may be 1%, 5%, 10%, 20%, or the like. Computing device 12 may compare the first and second measured voltages by subtracting one of the first or second measured voltages from the other of the first or second measured voltages, by taking a ratio of one of the first or second measured voltages to the other of the first or second measured voltages, or the like, and then determining a percentage difference between the first or second measured voltages. Computing device 12 then may determine that material 16 includes a crack or other defect in response to at least one of the comparisons indicating that material 16 includes a crack or other defect or in response to at least a threshold number of the comparisons indicating that material 16 includes a crack or other defect.

In some examples, in addition to using the respective measured voltages to determine whether material includes a crack or other defect (60), computing device 12 may utilize respective control voltages as described above with reference to FIG. 3.

Figure 5:
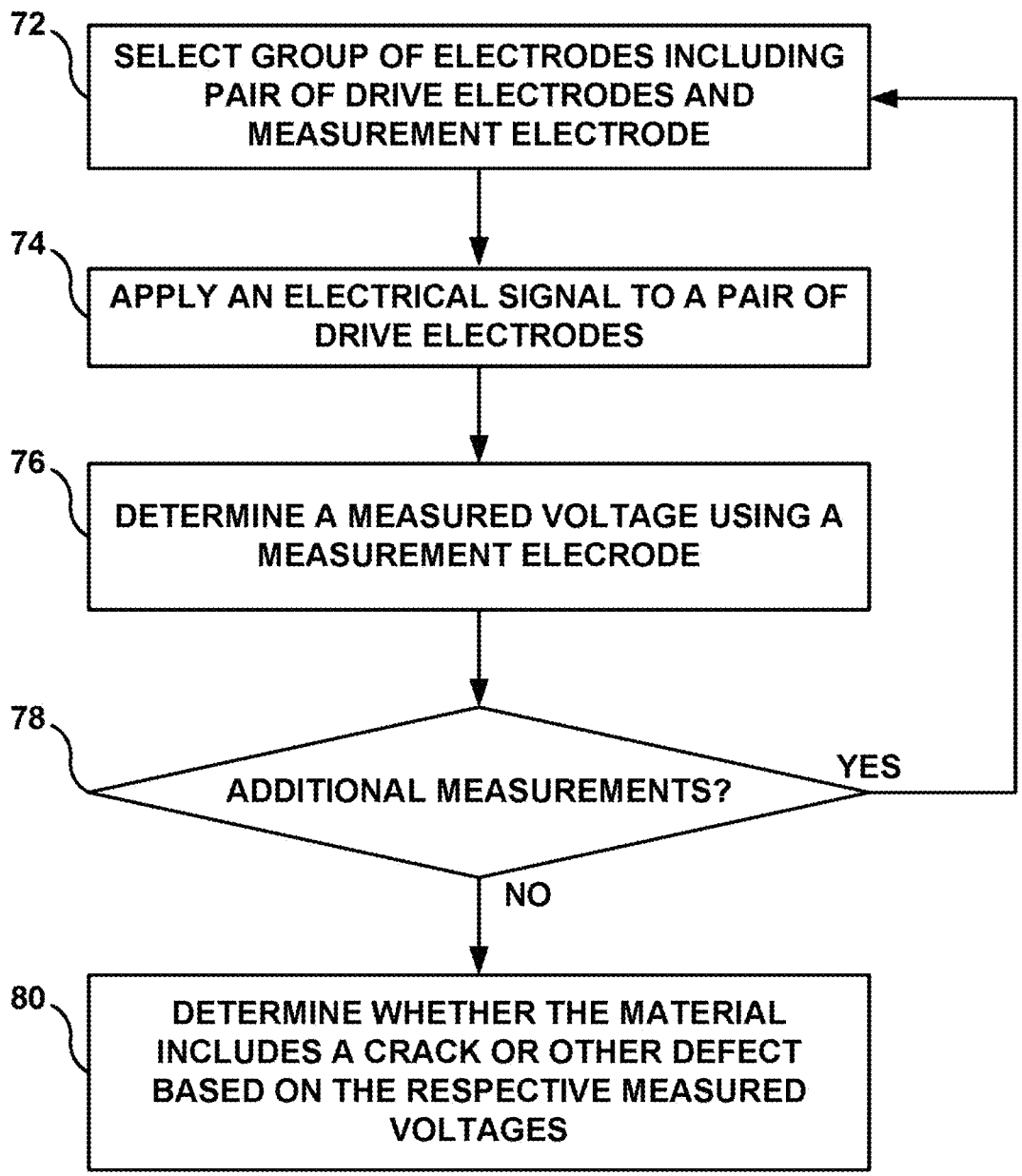

FIG. 5 is another flow diagram illustrating another example technique for determining whether a material includes a crack or other defect based on a comparison between at least a first measured voltage associated with the material and a second measured voltage associated with the material. The technique of FIG. 5 will be described with concurrent reference to system 10 of FIG. 1, but it will be understood that other systems that include more or fewer components than system 10 may perform the technique of FIG. 5 (e.g., a system that includes only computing device 12), and that system 10 may be used to perform other techniques (e.g., the techniques of FIGS. 3 and 4, among other techniques).

The technique of FIG. 5 includes selecting a group of electrodes including a pair of drive electrodes and a measurement electrode (72). Each respective group of electrodes may be geometrically configured to achieve measurement of a substantially similar voltage (e.g., the same or nearly the same voltage) in the absence of a crack or other defect. Each respective group of electrodes may include a pair of drive electrodes and one or two measurement electrodes. For example, a group of electrodes may include a pair of drive electrodes separated by one or two measurement electrodes. Using electrodes 18 shown in FIG. 1, an example of this configuration may include a pair of drive electrodes that includes first electrode 18A and fourth electrode 18D, and a pair of measurement electrodes that includes second electrode 18B and third electrode 18C. Another example of this configuration may include a pair of drive electrodes that includes first electrode 18A and third electrode 18C, and a measurement electrode that includes second electrode 18B (to measure a single-ended voltage using second electrode 18B and reference electrode 22). Other geometric configurations of groups of electrodes (e.g., other spacings between pairs of drive electrodes and, optionally, pairs of measurement electrode) are also possible.

In some examples, each group of electrodes may not share any electrodes with each other group of electrodes. In other examples, each group of electrodes may share one or more electrodes with another group of electrodes. For example, a first group of electrodes may include first electrode 18A and fourth electrode 18D as a pair of drive electrodes, and may include second electrode 8B and third electrode 18C as a pair of drive electrodes. A second group of electrodes may include second electrode 18B and fifth electrode 18E as a pair of drive electrodes, and third electrode 18C and fourth electrode 18D as a pair of measurement electrodes. In other words, each group of electrodes may include four electrodes, the two outer electrodes being drive electrodes and the two inner electrodes being measurement electrodes. Each respective group of electrodes may be formed by four adjacent electrodes, and each subsequent group may be formed by moving one electrode to the right (or to the left). In some examples, the number of groups of electrodes may equal the number of electrodes 18. In examples such as this, the placement of each electrode of electrodes 18 may be so that the voltage measured using each respective group of electrodes is substantially the same as the voltage measured using each other respective group of electrodes.

Computing device 12 may select the group of electrodes by causing switch network 20 to electrically couple electrical signal source 14 to a selected pair of electrodes 18, which serves as a pair of drive electrodes. Computing device 12 also may cause switch network 20 to electrically couple computing device 12 to a selected measurement electrode or pair of measurement electrodes. The selected pair of measurement electrodes may be any two electrodes from electrodes 18, neither of which is being used as one of the electrodes in the pair of drive electrodes, or may be reference electrode 22 and any one of electrodes 18 that is not being used as one of the electrodes in the drive pair of electrodes.

Computing device 12 then may cause electrical signal source 14 to apply the electrical signal to the first pair of drive electrodes electrically coupled to material 16 (74), e.g., via switch network 20. The electrical signal may include an AC signal or a DC signal, and may include a current signal or a voltage signal. In some examples, the type of electrical signal may depend on the composition of material 16. For example, a DC signal may be used to measure a voltage of an electrically conductive or electrically semiconductive material, while an AC signal may be used to measure a voltage of an electrically conductive material, an electrically semiconductive material, or a dielectric material. Computing device 12 also may control electrical signal source 14 to generate the predetermined electrical signal with a selected amplitude, duration, frequency, and other signal characteristics.

Computing device 12 also may, while applying the electrical signal to the pair of drive electrodes, determine a measured voltage using the measurement electrode of the selected group (76).

The technique of FIG. 5 also includes determining, by computing device 12, whether there are additional voltage measurements to be performed (78). Computing device 12 may determine whether there are additional voltage measurements to be performed (78) by determining whether there additional groups of electrodes to be selected. For example, computing device 12 may be configured to utilize each group of electrodes to determine a measured voltage.

Upon determining that there is an additional voltage measurement to be performed (the "YES" branch of decision block 78), computing device 12 may select a new group of electrodes by causing switch network 20 to electrically couple the selected pair of drive electrodes to electrical signal source 14 and causing switch network 20 to electrically couple the selected measurement electrode to computing device 12. Computing device 12 then may cause electrical signal source 14 to apply the electrical signal to the new selected pair of drive electrodes (74), and, while electrical signal source 14 is applying the electrical signal to the selected pair of drive electrodes (74), may determine a respective measured voltage using the selected measurement electrode (76). Again, computing device 12 may determine whether there is are additional measurements to be performed (78). In response to determining that there is an additional voltage measurement to be performed (the "YES" branch of decision block 78), computing device 12 may select a new group of electrodes by causing switch network 20 to electrically couple the selected pair of drive electrodes to electrical signal source 14 and causing switch network 20 to electrically couple the selected measurement electrode to computing device 12. Computing device 12 then may cause electrical signal source 14 to apply the electrical signal to the new selected pair of drive electrodes (74), and, while electrical signal source 14 is applying the electrical signal to the selected pair of drive electrodes (74), may determine a respective measured voltage using the selected measurement electrode (76). Computing device 12 may repeat this algorithm until determining that there are no additional measurements to be performed (the "NO" branch of decision block 78).

Computing device 12 then may determine whether material 16 includes a crack or other defect based on the respective measured voltages (80). As described above, for each group, the measured voltage in the absence of a crack or other defect is substantially the same. As such, computing device 12 may compare any measured voltage to any other measured voltage (or multiple other measured voltages) to determine if the measured voltage indicates that material 16 includes a crack or other defect. For example, computing device 12 may compare each measured voltage to each other measured voltage, and determine if each respective comparison indicates that material 16 includes a crack or other defect.

In response to a first respective measured voltage being substantially the same as a second respective measured voltage (e.g., within a threshold amount of each other), computing device 12 may determine that the comparison indicates that material 16 does not include a crack or other defect. On the other hand, a first respective measured voltage not being substantially the same as a second respective measured voltage (e.g., different than each other by more than a threshold amount), computing device 12 may determine the comparison indicates that material 16 includes a crack or other defect. The threshold amount may be the same or slightly greater than the threshold amount used to determine the position of electrodes 18. For example, the threshold amount may be 1%, 5%, 10%, 20%, or the like. Computing device 12 may compare the respective measured voltages by subtracting one of the respective measured voltages from the other of the respective measured voltages, by taking a ratio of one of the respective measured voltages and the other of the respective measured voltages, or the like, and then determining a percentage difference between the respective measured voltages. Computing device 12 then may determine that material 16 includes a crack or other defect in response to at least one of the comparisons indicating that material 16 includes a crack or other defect or in response to at least a threshold number of the comparisons indicating that material 16 includes a crack or other defect.

In some examples, in addition to using the respective measured voltages to determine whether material includes a crack or other defect (80), computing device 12 may utilize respective control voltages as described above with reference to FIG. 3.

In any of the techniques described herein, computing device 12 may output a representation of the determination of whether material 16 includes a crack or other defect. In some examples, the representation may include a simplified output, such as an indication of "Yes" or "No," "Crack" or "No Crack," "Damaged" or "Intact," or the like. The representation may be textual, icon-based, color-based, or the like. For example, the representation may include a green light to represent that material 16 is still intact or a red light to represent that material 16 is damages or includes a crack or other defect.

In this way, utilizing comparisons between multiple voltage measurements from a material may allow determination of whether a material includes a crack or other defect without previous measurement of control voltages, which may simplify determination of whether the material includes the crack or other defect. Further, as the multiple voltage measurements are performed at substantially the same time (e.g., as part of a single set of measurements), the material may be expected to be at substantially the same temperature (e.g., the same temperature or nearly the same temperature). Thus, temperature may be less of a factor in the comparisons. This may be important for some materials, such as semiconductors, whose conductivity changes significantly as a function of temperature.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Clause 1: A method for detecting a crack or defect in a material, the method comprising: applying a first electrical signal to a first pair of drive electrodes, wherein the first pair of drive electrodes is selected from a set of N electrodes electrically coupled to the material; while applying the first electrical signal to the first pair of drive electrodes, determining a first measured voltage using a first measurement electrode, wherein the first measurement electrode is from the set of N electrodes; applying a second electrical signal to a second pair of drive electrodes, wherein the second pair of drive electrodes is selected from the set of N electrodes; while applying the second electrical signal to the second pair of drive electrodes, determining a second measured voltage using a second, different measurement electrode, wherein the second, different measurement electrode is from the set of N electrodes; and determining whether the material includes a crack or other defect based on a comparison between the first measured voltage and the second measured voltage.

Clause 2: The method of clause 1, wherein the first electrical signal is substantially the same as the second electrical signal.

Clause 3: The method of claim 1 or 2, wherein: the first pair of drive electrodes and the second pair of drive electrodes is the same pair of drive electrodes; the respective electrodes of the pair of drive electrodes is disposed on a symmetry of the material; and the first measurement electrode is substantially symmetrical to the second, different measurement electrode with reference to the symmetry of the material.

Clause 4: The method of clause 3, wherein the symmetry of the material is a point, a line, a plane, a curve, or a manifold, and wherein a single mathematical operation made with reference to the symmetry maps each electrode of the set of N electrodes to another electrode of the set of N electrodes.

Clause 5: The method of clause 1 or 2, wherein: the first pair of drive electrodes is different from the second pair of drive electrodes; the first pair of drive electrodes is substantially symmetrical to the second pair of drive electrodes with reference to the symmetry of the material; and the first measurement electrode is substantially symmetrical to the second, different measurement electrode with reference to the symmetry of the material.

Clause 6: The method of clause 5, wherein the symmetry of the material is a point, a line, a plane, a curve, or a manifold, and wherein a single mathematical operation made with reference to symmetry the maps each electrode of the set of N electrodes to another electrode of set of N electrodes.

Clause 7: The method of any one of clauses 1 to 6, wherein the geometric configuration of the first pair of drive electrodes and the first measurement electrode, and the geometric configuration of the second pair of drive electrodes and the second, different measurement electrode are selected so that, in the absence of a crack or other defect, the first measured voltage is substantially the same as the second measured voltage.

Clause 8: The method of clause 7, wherein determining whether the material includes the crack or other defect based on the comparison between the first measured voltage and the second measured voltage comprises determining that the material includes the crack or other defect in response to the first measured voltage and the second measured voltage being different by more than a threshold amount.

Clause 9: The method of any one of clauses 1 to 8, wherein the electrical signal is a voltage signal or a current signal.

Clause 10: The method of any one of clauses 1 to 9, further comprising, before determining whether the material includes the crack or other defect based on the comparison between the first measured voltage and the second measured voltage: determining a first adjusted measured voltage based on the first measured voltage and a first control voltage associated with the first measurement electrode; determining a second adjusted measured voltage based on the second measured voltage and a second control voltage associated with the second, different measurement electrode; wherein determining whether the material includes the crack or other defect based on the comparison between the first measured voltage and the second measured voltage comprises determining whether the material includes the crack or other defect based on a comparison between the first adjusted measured voltage and the second adjusted measured voltage.

Clause 11: The method of any one of clauses 1 to 10, wherein: a plurality of electrodes are distributed across a surface area of the material; and the plurality of electrodes include the first pair of drive electrodes, the second pair of drive electrodes, the first measurement electrode, and the second, different measurement electrode.

Clause 12: The method of any one of clauses 1 to 10, wherein: a plurality of electrodes are distributed around a perimeter of the material; and the plurality of electrodes include the first pair of drive electrodes, the second pair of drive electrodes, the first measurement electrode, and the second measurement electrode.

Clause 13: The method of any one of claims 1 to 12, wherein: determining the first measured voltage using the first measurement electrode comprises determining the first measured voltage between a first pair of measurement electrodes; the first pair of measurement electrodes is selected from the set of N electrodes; determining the second measured voltage using the second, different measurement electrode comprises determining the second measured voltage between a second, different pair of measurement electrodes; and the second, different pair of measurement electrodes is from the set of N electrodes.

Clause 14: A method for detecting a crack or defect in a material, the method comprising: for each respective pair of drive electrodes of at least one pair of drive electrodes electrically coupled to the material, applying an electrical signal to the respective pair of drive electrodes; for each respective pair of drive electrodes, determining a respective measured voltage using a respective measurement electrode of a plurality of measurement electrodes while applying the electrical signal to the respective pair of drive electrodes, wherein each respective measurement electrode is substantially symmetrical to another measurement electrode with reference to a symmetry of the material, and wherein the plurality of measurement electrodes are electrically coupled to the material; and determining whether the material includes a crack or other defect based on comparisons between the respective measured voltages associated with respective measurement electrodes that are substantially symmetrical with reference to the symmetry of the material.

Clause 15: The method of clause 14, wherein: the at least one pair of drive electrodes is a single pair of drive electrodes; the respective electrodes of the single pair of drive electrodes are disposed on the symmetry of the material.

Clause 16: The method of clause 15, wherein the symmetry of the material is a point, a line, a plane, a curve, or a manifold, and wherein a single mathematical operation made with reference to the symmetry maps each measurement electrode of the plurality of measurement electrodes to another measurement electrode of the plurality of measurement electrodes.

Clause 17: The method of clause 14, wherein: the at least one pair of drive electrodes includes a plurality of pairs of drive electrodes; and each respective pair of drive electrodes is substantially symmetrical to another pair of drive electrodes with reference to a symmetry of the material.

Clause 18: The method of clause 17, wherein the symmetry of the material is a point, a line, a plane, a curve, or a manifold, and wherein a single mathematical operation made with reference to the symmetry maps each respective pair of drive electrodes of the plurality of pairs of drive electrodes to another respective pair of drive electrodes of the plurality of pairs of drive electrodes.

Clause 19: The method of any one of clauses 14 to 18, wherein the electrical signal is a voltage signal or a current signal.

Clause 20: The method of any one of clauses 14 to 19, wherein determining whether the material includes a crack or other defect based on comparisons between the respective measured voltages associated with respective measurement electrodes that are substantially symmetrical with reference to the symmetry of the material comprises determining that the material includes the crack or other defect in response to a respective measured voltage associated with a first measurement electrode being different by more than a threshold amount from a respective measured voltage associated with a second measurement electrode that is substantially symmetrical to the first measurement electrode.

Clause 21: The method of any one of clauses 14 to 20, further comprising, before determining whether the material includes a crack or other defect based on comparisons between the respective measured voltages associated with respective measurement electrodes that are substantially symmetrical with reference to the symmetry of the material: for each respective measured voltage, determining respective adjusted measured voltage based on the respective measured voltage and a respective reference voltage associated with the respective measurement electrode; and wherein determining whether the material includes a crack or other defect based on comparisons between the respective measured voltages associated with respective measurement electrodes that are substantially symmetrical with reference to the symmetry of the material comprises determining whether the material includes the crack or other defect based on comparisons between the respective adjusted measured voltages associated with respective measurement electrodes that are substantially symmetrical with reference to the symmetry of the material.

Clause 22: The method of any one of clauses 14 to 21, wherein a plurality of electrodes are distributed across a surface area of the material, and wherein the plurality of electrodes include the at least one pair of drive electrodes and the plurality of measurement electrodes.

Clause 23: The method of any one of clauses 14 to 21, wherein a plurality of electrodes are distributed around a perimeter of the material, and wherein the plurality of electrodes include the at least one pair of drive electrodes and the plurality of measurement electrodes.

Clause 24: The method of any one of clauses 14 to 23, wherein determining the respective measured voltage using the respective measurement electrode of the plurality of measurement electrodes while applying the electrical signal to the respective pair of drive electrodes comprises determining a respective measured voltage between a respective pair of measurement electrodes of the plurality of measurement electrodes while applying the electrical signal to the respective pair of drive electrodes.

Clause 25: A method for detecting a crack or defect in a material, the method comprising: for each respective pair of drive electrodes of a plurality of pairs of drive electrodes electrically coupled to the material, applying a respective electrical signal to the respective pair of drive electrodes; for each respective pair of drive electrodes, determining a respective measured voltage using a respective measurement electrode of a plurality of measurement electrodes while applying the electrical signal to the respective pair of drive electrodes, wherein the geometric configuration of each respective combination of a respective pair of drive electrodes and a respective measurement electrode is selected so that, in the absence of a crack, each respective measured voltage is substantially the same as at least one other respective measured voltage; and determining whether the material includes a crack or other defect based on comparisons between the respective measured voltages.

Clause 26: The method of clause 25, wherein the geometric configuration of each respective combination of a respective pair of drive electrodes and a respective measurement electrode is selected so that, in the absence of a crack, each respective measured voltage is substantially the same as each other respective measured voltage.

Clause 27: The method of clause 25 or 26, wherein determining the respective measured voltage using the respective measurement electrode of the plurality of measurement electrodes while applying the electrical signal to the respective pair of drive electrodes comprises determining a respective measured voltage between a respective pair of measurement electrodes of the plurality of measurement electrodes while applying the electrical signal to the respective pair of drive electrodes, wherein the geometric configuration of each respective pair of drive electrodes and the respective pair of measurement electrodes is selected so that, in the absence of a crack, each respective measured voltage is substantially the same as all other respective measured voltages.

Clause 28: The method of any one of clauses 25 to 27, further comprising, before determining whether the material includes the crack or other defect based on comparisons between the respective measured voltages: for each respective measured voltage, determining a respective adjusted measured voltage based on the respective measured voltage and a respective control voltage associated with the respective measurement electrode; wherein determining whether the material includes the crack or other defect based on comparisons between the respective measured voltages comprises determining whether the material includes a crack or other defect based on comparisons between the respective adjusted measured voltages.

Clause 29: The method of any one of clauses 25 to 28, wherein the electrical signal is a voltage signal or a current signal.

Clause 30: The method of any one of clauses 25 to 29, wherein each respective applied electrical signal is substantially the same.

Clause 31: The method of any one of clauses 25 to 30, wherein determining whether the material includes the crack or other defect based on comparisons between the respective measured voltages comprises determining that the material includes the crack or other defect in response to a first respective voltage being different than at least one other respective voltage by more than a threshold amount.

Clause 32: The method of any one of clauses 25 to 31, wherein a plurality of electrodes are distributed across a surface area of the material, and wherein the plurality of electrodes include the plurality of pairs of drive electrodes and the plurality of measurement electrodes.

Clause 33: The method of any one of clauses 25 to 31, wherein a plurality of electrodes are distributed around a perimeter of the material, and wherein the plurality of electrodes include the plurality of pairs of drive electrodes and the plurality of measurement electrodes.

Clause 34: A system comprising: a set of N electrodes electrically coupled to a material; an electrical signal source; and a computing device configured to: cause the electrical signal source to apply a first electrical signal to a first pair of drive electrodes, wherein the first pair of drive electrodes is selected from the set of N electrodes; while the electrical signal source is applying the first electrical signal to the first pair of drive electrodes, determine a first measured voltage using a first measurement electrode, wherein the first measurement electrode is from the set of N electrodes; cause the electrical signal source to apply a second electrical signal to a second pair of drive electrodes, wherein the second pair of drive electrodes is selected from the set of N electrodes; while the electrical signal source is applying the second electrical signal to the second pair of drive electrodes, determine a second measured voltage using a second, different measurement electrode, wherein the second, different measurement electrode is from the set of N electrodes; and determine whether the material includes a crack or other defect based on a comparison between the first measured voltage and the second measured voltage.

Clause 35: The system of clause 34, wherein the first electrical signal is substantially the same as the second electrical signal.

Clause 36: The system of clause 34 or 35, wherein: the first pair of drive electrodes and the second pair of drive electrodes is the same pair of drive electrodes; the respective electrodes of the pair of drive electrodes is disposed on a symmetry of the material; and the first measurement electrode is substantially symmetrical to the second, different measurement electrode with reference to the symmetry of the material.

Clause 37: The system of clause 36, wherein the symmetry of the material is a point, a line, a plane, a curve, or a manifold, and wherein a single mathematical operation made with reference to the symmetry maps each electrode of the set of N electrodes to another electrode of the set of N electrodes.

Clause 38: The system of clause 34 or 35, wherein: the first pair of drive electrodes is different from the second pair of drive electrodes; the first pair of drive electrodes is substantially symmetrical to the second pair of drive electrodes with reference to the symmetry of the material; and the first measurement electrode is substantially symmetrical to the second, different measurement electrode with reference to the symmetry of the material.

Clause 39: The system of clause 38, wherein the symmetry of the material is a point, a line, a plane, a curve, or a manifold, and wherein a single mathematical operation made with reference to the symmetry maps each electrode of the set of N electrodes to another electrode of set of N electrodes.

Clause 40: The system of any one of clauses 34 to 39, wherein the geometric configuration of the first pair of drive electrodes and the first measurement electrode, and the geometric configuration of the second pair of drive electrodes and the second, different measurement electrode are selected so that, in the absence of a crack, the first measured voltage is substantially the same as the second measured voltage.

Clause 41: The system of clause 40, wherein the computing device is configured to determine whether the material includes the crack or other defect based on the comparison between the first measured voltage and the second measured voltage by at least determining that the material includes the crack or other defect in response to the first measured voltage and the second measured voltage being different by more than a threshold amount.

Clause 42: The system of any one of clauses 34 to 41, wherein the electrical signal is a voltage signal or a current signal.

Clause 43: The system of any one of clauses 34 to 42, wherein the computing device is further configured to, before determining whether the material includes the crack or other defect based on the comparison between the first measured voltage and the second measured voltage: determine a first adjusted measured voltage based on the first measured voltage and a first control voltage associated with the first measurement electrode; and determine a second adjusted measured voltage based on the second measured voltage and a second control voltage associated with the second, different measurement electrode; and wherein the computing device is configured to determine whether the material includes the crack or other defect based on the comparison between the first measured voltage and the second measured voltage by at least determining whether the material includes the crack or other defect based on a comparison between the first adjusted measured voltage and the second adjusted measured voltage.

Clause 44: The system of any one of clauses 34 to 43, wherein the set of N electrodes is distributed across a surface area of the material.

Clause 45: The system of any one of clauses 34 to 43, wherein the set of N electrodes is distributed around a perimeter of the material.

Clause 46: The system of any one of clauses 34 to 45, wherein: the computing device is configured to determine the first measured voltage between a first pair of measurement electrodes and determine the second measured voltage between a second, different pair of measurement electrodes; and the first pair of measurement electrodes and the second, different pair of measurement electrodes are selected from the set of N electrodes.

Clause 47: A system comprising: a set of N electrodes electrically coupled to a material; an electrical signal source; and a computing device configured to: for each respective pair of drive electrodes of at least one pair of drive electrodes, cause the electrical signal source to apply an electrical signal to the respective pair of drive electrodes, wherein the at least one pair of drive electrodes is from the set of N electrodes; for each respective pair of drive electrodes, determine a respective measured voltage using a respective measurement electrode of a plurality of measurement electrodes while the electrical signal source is applying the electrical signal to the respective pair of drive electrodes, wherein each respective measurement electrode is substantially symmetrical to another measurement electrode with reference to the symmetry of the material, and wherein the plurality of measurement electrodes are from the set of N electrodes; and determine whether the material includes a crack or other defect based on comparisons between the respective measured voltages associated with respective measurement electrodes that are substantially symmetrical with reference to the symmetry of the material.

Clause 48: The system of clause 47, wherein: the at least one pair of drive electrodes is a single pair of drive electrodes; the respective electrodes of the single pair of drive electrodes are disposed on the symmetry of the material.

Clause 49: The system of clause 48, wherein the symmetry of the material is a point, a line, a plane, a curve, or a manifold, and wherein a single mathematical operation made with reference to the symmetry maps each measurement electrode of the plurality of measurement electrodes to another measurement electrode of the plurality of measurement electrodes.

Clause 50: The system of clause 47, wherein: the at least one pair of drive electrodes includes a plurality of pairs of drive electrode pairs; each respective pair of drive electrodes is substantially symmetrical to another pair of drive electrodes with reference to a symmetry of the material.

Clause 51: The system of clause 50, wherein the symmetry of the material is a point, a line, a plane, a curve, or a manifold, and wherein a single mathematical operation made with reference to the symmetry maps each respective pair of drive electrodes of the plurality of pairs of drive electrodes to another respective pair of drive electrodes of the plurality of pairs of drive electrodes.

Clause 52: The system of any one of clauses 47 to 51, wherein the electrical signal is a voltage signal or a current signal.

Clause 53: The system of any one of clauses 47 to 52, wherein the computing device is configured to determine whether the material includes the crack or other defect by at least determining that the material includes the crack or other defect in response to a respective measured voltage associated with a first measurement electrode being different by more than a threshold amount from a respective measured voltage associated with a second measurement electrode that is substantially symmetrical to the first measurement electrode.

Clause 54: The system of any one of clauses 47 to 53, wherein: the computing device is further configured to, before determining whether the material includes a crack or other defect, for each respective measured voltage, determine respective adjusted measured voltage based on the respective measured voltage and a respective reference voltage associated with the respective measurement electrode; and the computing device is configured to determine whether the material includes a crack or other defect by at least determining whether the material includes the crack or other defect based on comparisons between the respective adjusted measured voltages associated with respective measurement electrodes that are substantially symmetrical with reference to the symmetry of the material.

Clause 55: The system of any one of clauses 47 to 54, wherein the set of N electrodes is distributed across a surface area of the material.

Clause 56: The system of any one of clauses 47 to 54, wherein the set of N electrodes is distributed around a perimeter of the material.

Clause 57: The system of any one of clauses 47 to 56, wherein the computing device is configured to determine a respective measured voltage between a respective pair of measurement electrodes of the plurality of measurement electrodes while applying the electrical signal to the respective pair of drive electrodes.

Clause 58: A system comprising: a set of N electrodes electrically coupled to a material; an electrical signal source; and a computing device configured to: for each respective pair of drive electrodes of a plurality of pairs of drive electrodes electrically coupled to the material, cause the electrical signal source to apply a respective electrical signal to the respective pair of drive electrodes, wherein the plurality of pairs of drive electrodes are from the set of N electrodes; for each respective pair of drive electrodes, determine a respective measured voltage using a respective measurement electrode of a plurality of measurement electrodes while the electrical signal source is applying the electrical signal to the respective pair of drive electrodes, wherein a geometric configuration of each respective combination of a pair of drive electrodes and a respective measurement electrode is selected so that, in the absence of a crack, each respective measured voltage is substantially the same as at least one other respective measured voltage; and determine whether the material includes a crack or other defect based on comparisons between the respective measured voltages.

Clause 59: The system of clause 58, wherein the geometric configuration of each respective combination of a pair of drive electrodes and a respective measurement electrode is selected so that, in the absence of a crack, each respective measured voltage is substantially the same as each other respective measured voltage.

Clause 60: The system of claim 58 or 59, wherein the computing device is configured to determine a respective measured voltage between a respective pair of measurement electrodes of the plurality of measurement electrodes while applying the electrical signal to the respective pair of drive electrodes, wherein the geometric configuration of each respective pair of drive electrodes and the respective pair of measurement electrodes is selected so that, in the absence of a crack, each respective measured voltage is substantially the same as all other respective measured voltages.

Clause 61: The system of any one of clauses 58 to 60, wherein: the computing device is further configured to, before determining whether the material includes the crack or other defect based on comparisons between the respective measured voltages, for each respective measured voltage, determining a respective adjusted measured voltage based on the respective measured voltage and a respective control voltage associated with the respective measurement electrode; and the computing device is configured to determine whether the material includes the crack or other defect by at least determining whether the material includes a crack or other defect based on comparisons between the respective adjusted measured voltages.

Clause 62: The system of any one of clauses 58 to 61, wherein the electrical signal is a voltage signal or a current signal.

Clause 63: The system of any one of clauses 58 to 62, wherein each respective applied electrical signal is substantially the same.

Clause 64: The system of any one of clauses 58 to 63, wherein the computing device is configured to determine whether the material includes the crack or other defect by at least determining that the material includes the crack or other defect in response to a first respective voltage being different than at least one other respective voltage by more than a threshold amount.

Clause 65: The system of any one of clauses 58 to 64, wherein the set of N electrodes is distributed across a surface area of the material.

Clause 66: The system of any one of clauses 58 to 64, wherein the set of N electrodes is distributed around a perimeter of the material.

Example

A 2D model simulation was used to place electrodes. The initial CAD describing the material was imported and using a combination of meshing tools (Gmsh, Netgen) and Electrical Impedance Tomography and Diffuse Optical Tomography Reconstruction Software (EIDORS) functions, the mesh shown in FIG. 6 was created and used in simulations. EIDORS is available at eidors3d.sourceforge.net. The simulations for positioning the electrodes included the following steps:

1. Identify a plane of symmetry.
2. Place two electrodes on this plane of symmetry.
3. Place an equal number of electrodes on either side of the plane of symmetry, such that the additional electrodes result in symmetry of the combined system.
4. For each integer 1:16, simulate an applied current to a pair of drive electrodes X and X+3, determine a simulated measured voltage at a pair of measurement electrodes X+1 and X+2. This simulation was performed in MATLAB® using the algorithm fwd_solve in the package EIDORS was used to solve the reconstruction problem. MATLAB® is available from MathWorks®, Inc., Natick, Mass., United States.
5. Determine a minimum measured voltage for the 16 measured voltages, along with the electrode numbers of the pair of measurement electrodes associated with the minimum voltage.
6. Determine the measured voltages for the pairs of measurement electrodes on either side of the pair of measurement electrodes associated with the minimum measured voltage.
7. Determine which voltage between the measured voltages on either side of the minimum measured voltage is larger.
8. Identify the common electrode from the pair of electrodes associated with the minimum measured voltage and the pair of electrodes associated with the larger measured voltage between the pairs of measurement electrodes on either side of the pair of measurement electrodes associated with the minimum measured voltage.
9. Move the common electrode away from the other electrode in the pair of electrodes associated with the minimum value by a predetermined distance.
10. Move the electrode that is symmetric to the electrode that is moved in step 9 to maintain symmetry of the electrodes.
11. Iterate steps 4 to 10 until the measured voltages fall within a specified tolerance.

Figure 6:
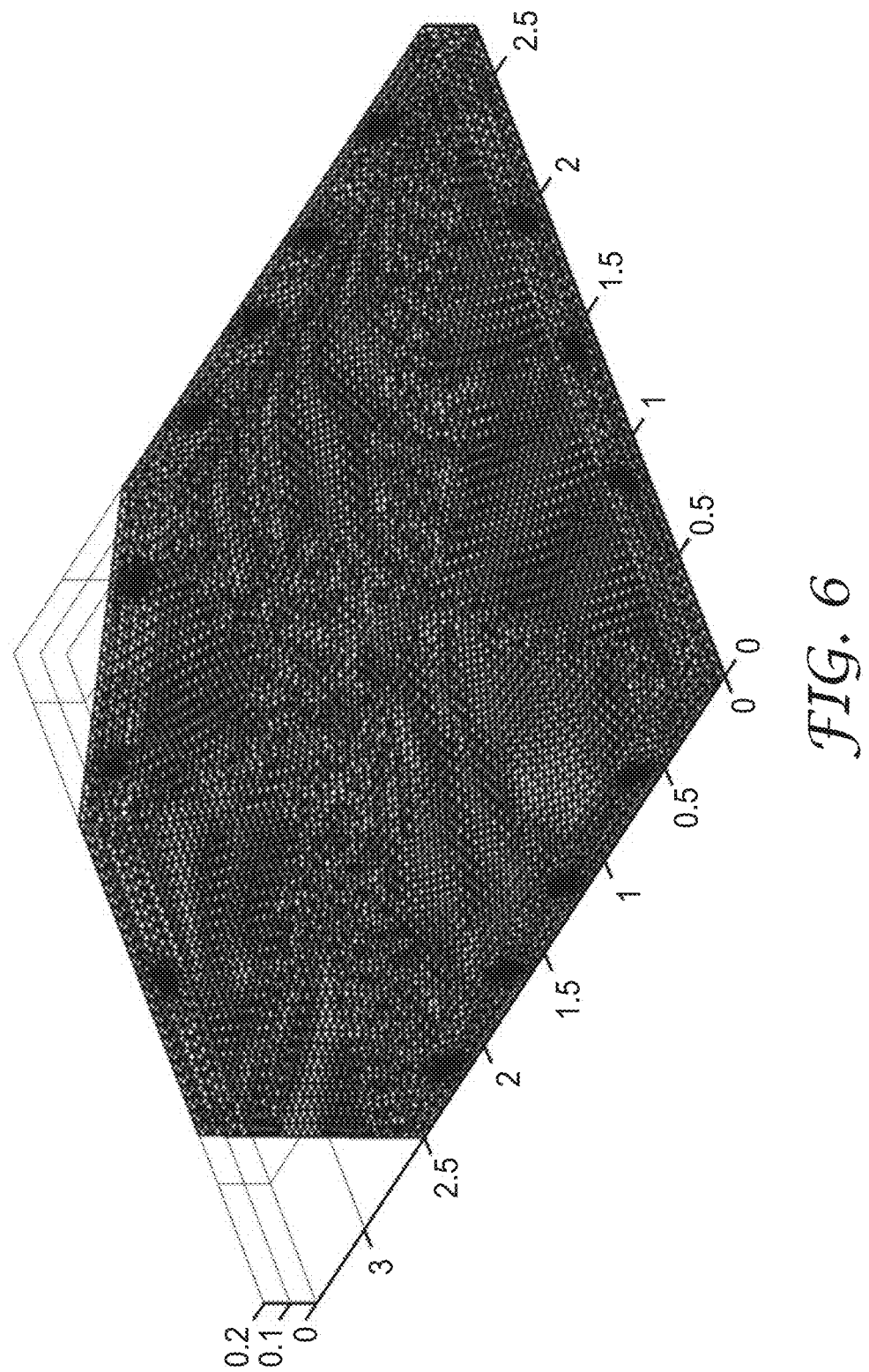
FIG. 6 is a diagram illustrating an example finite element model of a material that includes electrodes positioned on the material.

FIG. 6 is a diagram illustrating an example finite element model of a material that includes electrodes positioned on the material. The electrode positions determined by the simulation were (in units of mm):

| Electrode | X | Z |
| --- | --- | --- |
| 0 | 0 | 135 |
| 1 | 0 | 81.57041 |
| 2 | 54.21065 | 0 |
| 3 | 113.2 | 0 |
| 4 | 159.6842 | 0 |
| 5 | 211.5059 | 0 |
| 6 | 275.1349 | 19.54934 |
| 7 | 325.3673 | 58.61904 |
| 8 | 340 | 135 |
| 9 | 325.3673 | 211.381 |
| 10 | 275.1349 | 250.4507 |
| 11 | 211.5059 | 270 |
| 12 | 159.6842 | 270 |
| 13 | 113.2 | 270 |
| 14 | 52.21065 | 270 |
| 15 | 0 | 188.4296 |

Various examples have been described. These and other examples are within the scope of the following claims.

What is claimed is:

1. A method for detecting a defect in a material, the method comprising:
applying, via each respective pair of drive electrodes of a plurality of pairs of drive electrodes electrically coupled to the material, a respective electrical signal;
for each respective pair of drive electrodes, determining a respective measured voltage using a respective measurement electrode of a plurality of measurement electrodes electrically coupled to the material while applying the respective electrical signal to the respective pair of drive electrodes, wherein a respective geometric configuration of each respective pair of drive electrodes and the corresponding respective measurement electrode is selected so that, in absence of the defect, each respective measured voltage is substantially equal to all other respective measured voltages measured at all remaining measurement electrodes of the plurality of measurement electrodes other than the respective measurement electrode; and determining that the material includes the defect based on comparisons between the respective measured voltage.

2. The method of claim 1, further comprising, before determining that the material includes the defect based on the comparisons between the respective measured voltages:

for each respective measured voltage, determining a respective adjusted measured voltage based on the respective measured voltage and a respective control voltage associated with the respective measurement electrode, wherein determining whether the material includes the defect based on the comparisons between the respective measured voltages comprises determining that the material includes the defect based on comparisons between the respective adjusted measured voltages.

3. The method of claim 1, wherein the respective electrical signal is a voltage signal or a current signal.

4. The method of claim 1, further comprising applying corresponding electrical signals of substantially equal magnitude to the respective electrical signal via all remaining pairs of the plurality of pairs of drive electrodes other than the respective pair of drive electrodes.

5. The method of claim 1, wherein determining that the material includes the defect based on the comparisons between the respective measured voltages comprises determining that the material includes the defect in response to determining that a first respective voltage is different from at least one other respective voltage by at least a threshold amount.

6. The method of claim 1, wherein a plurality of electrodes are distributed across a surface area of the material, and wherein the plurality of electrodes includes the plurality of pairs of drive electrodes and the plurality of measurement electrodes.

7. The method of claim 1, wherein a plurality of electrodes are distributed along a perimeter of the material, and wherein the plurality of electrodes includes the plurality of pairs of drive electrodes and the plurality of measurement electrodes.

8. The method of claim 1, wherein the defect is a crack in the material.

9. The method of claim 1, wherein the material is an armor plating.

10. A system comprising:
a set of N electrodes electrically coupled to a material;
an electrical signal source; and
a computing device configured to:
cause the electrical signal source to apply a first electrical signal to a pair of drive electrodes, wherein the pair of drive electrodes is selected from the set of N electrodes, and wherein respective electrodes of the pair of drive electrodes are disposed across a symmetry of the material;
while the electrical signal source is applying the first electrical signal to the pair of drive electrodes, determine a first measured voltage using a first measurement electrode, wherein the first measurement electrode is selected from the set of N electrodes;
cause the electrical signal source to apply a second electrical signal to the pair of drive electrodes;
while the electrical signal source is applying the second electrical signal to the pair of drive electrodes, determine a second measured voltage using a second, different measurement electrode that, wherein the second, different measurement electrode is from the set of N electrodes, and wherein the first measurement electrode is positioned substantially symmetrically with respect to the second, different measurement electrode with reference to the symmetry of the material; and
determine whether the material includes a defect based on a comparison between the first measured voltage and the second measured voltage.

11. The system of claim 10, wherein the symmetry of the material represents at least one of a point, a line, a plane, a curve, or a manifold, and wherein a single mathematical operation made with reference to the symmetry maps each electrode of the set of N electrodes to another electrode of the set of N electrodes.

12. The system of claim 10, wherein each of a first geometric configuration of the pair of drive electrodes and the first measurement electrode and a second geometric configuration of the pair of drive electrodes and the second, different measurement electrode are selected so that, in absence of the defect, the first measured voltage is substantially equal to the second measured voltage.

13. The system of claim 12, wherein the computing device is configured to determine whether the material includes the defect based on the comparison between the first measured voltage and the second measured voltage by at least determining that the material includes the defect in response to determining that the first measured voltage differs from the second measured voltage being different by at least a threshold amount.

14. The system of claim 10, wherein the electrical signal is a voltage signal or a current signal.

15. The system of claim 10, wherein the computing device is further configured to, before determining whether the material includes the defect based on the comparison between the first measured voltage and the second measured voltage:
determine a first adjusted measured voltage based on the first measured voltage and a first control voltage associated with the first measurement electrode; and
determine a second adjusted measured voltage based on the second measured voltage and a second control voltage associated with the second, different measurement electrode,
wherein to determine whether the material includes the defect based on the comparison between the first measured voltage and the second measured voltage, the computing device is configured to determine whether the material includes the defect based on a comparison between the first adjusted measured voltage and the second adjusted measured voltage.

16. The system of claim 10, wherein the set of N electrodes is distributed across a surface area of the material.

17. The system of claim 10, wherein the first electrical signal is of approximately equal magnitude in comparison to the second electrical signal.

18. The system of claim 10, wherein the defect is a crack in the material.

19. The system of claim 10, wherein the material is an armor plating.

* * * * *